US012672028B2

(12) United States Patent
Lin et al.

(10) Patent No.: US 12,672,028 B2
(45) Date of Patent: Jun. 30, 2026

(54) UPLINK DATA SPLITTING METHOD, TERMINAL DEVICE, AND CHIP SYSTEM

(71) Applicant: Huawei Technologies Co., Ltd., Shenzhen (CN)

(72) Inventors: Guibin Lin, Shanghai (CN); Xiaojun Sun, Shanghai (CN); Feng Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 616 days.

(21) Appl. No.: 18/014,275

(22) PCT Filed: Jul. 7, 2021

(86) PCT No.: PCT/CN2021/104869
§ 371 (c)(1),
(2) Date: Jan. 3, 2023

(87) PCT Pub. No.: WO2022/007820
PCT Pub. Date: Jan. 13, 2022

(65) Prior Publication Data
US 2023/0300675 A1 Sep. 21, 2023

(30) Foreign Application Priority Data
Jul. 8, 2020 (CN) .......................... 202010652195.3

(51) Int. Cl.
*H04W 24/08* (2009.01)
*H04W 28/086* (2023.01)
*H04W 28/10* (2009.01)

(52) U.S. Cl.
CPC ....... *H04W 28/0865* (2023.05); *H04W 24/08* (2013.01); *H04W 28/10* (2013.01)

(58) Field of Classification Search
CPC .......... H04W 40/02; H04W 4/06; H04L 45/66
See application file for complete search history.

(56) References Cited

U.S. PATENT DOCUMENTS

| | | | | |
|---|---|---|---|---|
| 2018/0310202 A1* | 10/2018 | Löhr | ...................... | H04W 76/27 |
| 2019/0098533 A1* | 3/2019 | Babaei | ...................... | H04L 1/08 |

(Continued)

FOREIGN PATENT DOCUMENTS

| | | |
|---|---|---|
| CN | 110691419 A | 1/2020 |

OTHER PUBLICATIONS

3GPP TS 38.331 V16.0.0 (Mar. 2020), Radio Resource Control (RRC) protocol specification(Release 16), 3rd Generation Partnership Project; Technical Specification Group Radio Access Network; NR, total 835 pages.

*Primary Examiner* — Kevin T Bates
*Assistant Examiner* — Hector Reyes
(74) *Attorney, Agent, or Firm* — Slater Matsil, LLP

(57) ABSTRACT

This application provides an uplink data splitting method, a terminal device, and a chip system, and relates to the field of communication technologies. The method includes the following: After determining that a timer expires, a terminal device determines, based on transmission capabilities of an LTE link and an NR link, a data amount of a data package transmitted on the LTE link and the NR link. The transmission capability of the LTE link is determined by the terminal device by transmitting a first detection data package on the LTE link before the timer expires. The transmission capability of the NR link is determined by the terminal device by transmitting a second detection data package on the NR link before the timer expires. The second detection data package is obtained through duplication based on the first detection data package. The terminal device sends same data packages to different communication links to detect transmission capabilities of the communication links. This avoids a phenomenon that data packages wait for each other, and does not affect normal transmission of a data service and user experience for a service.

18 Claims, 15 Drawing Sheets

(56) References Cited

U.S. PATENT DOCUMENTS

| | | | | |
|---|---|---|---|---|
| 2020/0015302 A1* | 1/2020 | Shikari | ............... | H04L 43/0876 |
| 2020/0119883 A1* | 4/2020 | Skarve | .................. | H04L 5/0032 |
| 2021/0266786 A1* | 8/2021 | Dudda | .................. | H04W 24/10 |
| 2022/0303854 A1* | 9/2022 | Salkintzis | ......... | H04W 36/0044 |
| 2023/0216751 A1* | 7/2023 | Barac | .................... | H04L 45/243 |
| | | | | 455/423 |

* cited by examiner

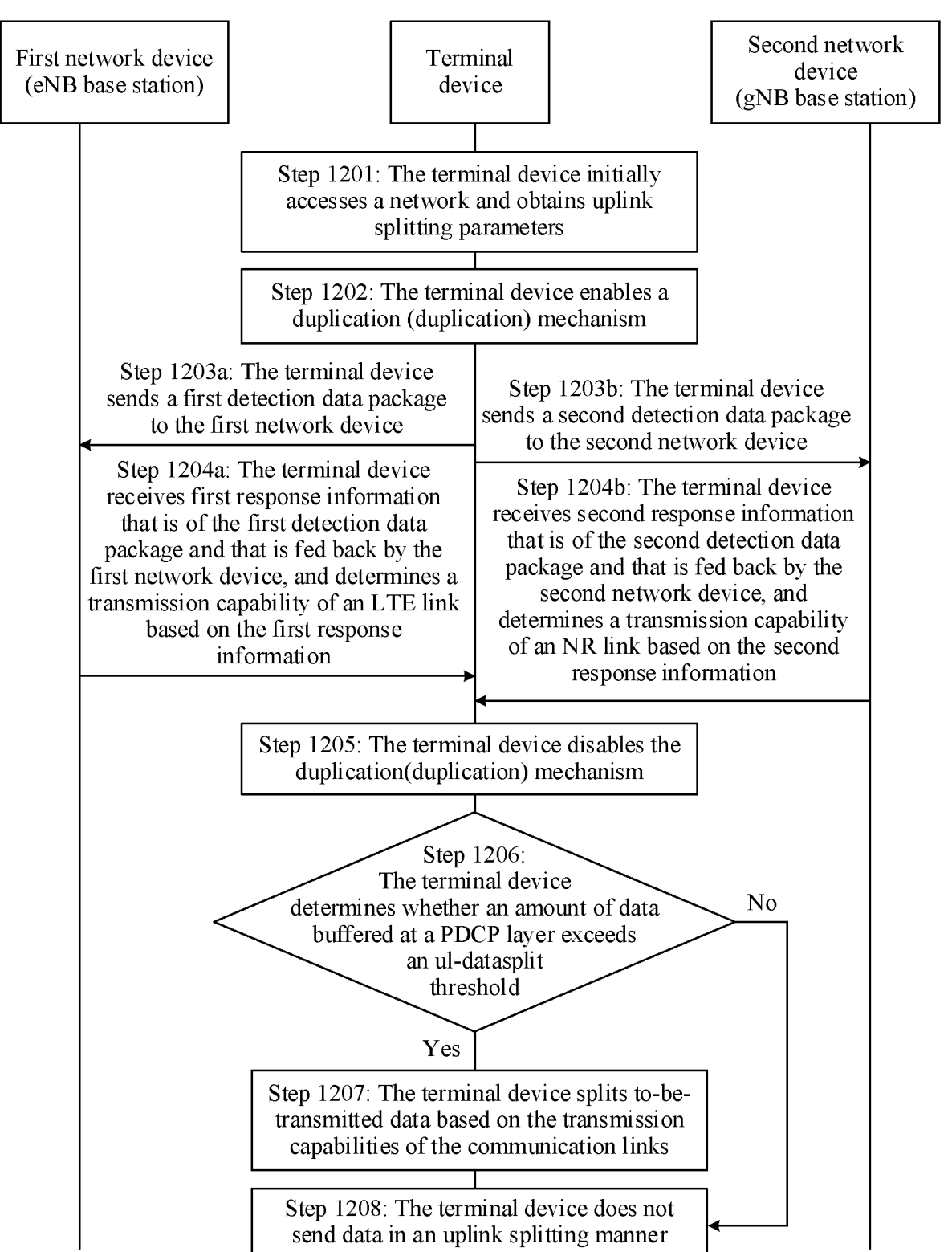

First network device
(eNB base station)

Terminal
device

Second network
device
(gNB base station)

Step 1201: The terminal device initially
accesses a network and obtains uplink
splitting parameters Step 1202: The terminal device enables a
duplication (duplication) mechanism Step 1203a: The terminal device
sends a first detection data package
to the first network device Step 1203b: The terminal device
sends a second detection data package
to the second network device Step 1204a: The terminal device
receives first response information
that is of the first detection data
package and that is fed back by the
first network device, and determines a
transmission capability of an LTE link
based on the first response
information Step 1204b: The terminal device
receives second response information
that is of the second detection data
package and that is fed back by the
second network device, and
determines a transmission capability
of an NR link based on the second
response information Step 1205: The terminal device disables the
duplication(duplication) mechanism Step 1206:
The terminal device
determines whether an amount of data
buffered at a PDCP layer exceeds
an ul-datasplit
threshold No Yes Step 1207: The terminal device splits to-be-
transmitted data based on the transmission
capabilities of the communication links Step 1208: The terminal device does not
send data in an uplink splitting manner

UPLINK DATA SPLITTING METHOD, TERMINAL DEVICE, AND CHIP SYSTEM

CROSS-REFERENCE TO RELATED APPLICATIONS

This application is a national stage of International Application No. PCT/CN2021/104869, filed on Jul. 7, 2021, which claims priority to Chinese Patent Application No. 202010652195.3, filed on Jul. 8, 2020. Both of the aforementioned applications are hereby incorporated by reference in their entireties.

TECHNICAL FIELD

This application relates to the field of communication technologies, and in particular, to an uplink data splitting method, a terminal device, and a chip system.

BACKGROUND

With development of science and technology, a user has an increasingly high requirement on a data transmission rate of a terminal device. To meet a requirement of the user on a communication rate, the 5th generation mobile communication technology (5th generation mobile networks, 5G) may support the terminal device in performing uplink splitting in non-standalone (non-standalone, NAS) networking, so that the terminal device obtains a good data transmission rate.

Uplink splitting relates to parameters such as a transmission primary path (primary path), an ul-datasplit threshold (ul-datasplit threshold), and pdcp-duplication (pdcp-duplication) that are of uplink splitting and that are defined in the 3rd generation partnership project (3rd generation partnership project, 3GPP) protocol. However, how to specifically perform uplink splitting so that the terminal device can obtain a good data transmission rate is not specified in the 3GPP protocol. In addition, it should be noted that how to perform splitting detection in different communication links and when to enable uplink splitting are both key technical problems to be resolved when uplink splitting is performed.

However, in a splitting detection solution provided in a current technology, a terminal device transmits service data packages of actual service content on a communication link, to detect transmission capabilities of different communication links. In this solution, a case in which a base station needs to reorder data packages transmitted on different communication links before the data packages can be transmitted to another network device is not considered. When there is a large difference between transmission capabilities of communication links, a data package is transmitted slowly on a communication link having a poor transmission capability, and it takes a long time for the data package to arrive at the base station. Therefore, when the service data packages sent by the terminal device arrive at the base station, the data packages may wait for each other. In addition, data package reordering consumes a large amount of time. Consequently, a service delay is long, and user experience for a service is poor.

SUMMARY

Based on this, this application provides an uplink data splitting method, a terminal device, and a chip system, to improve user experience for a service during uplink data splitting and splitting detection.

According to a first aspect, an embodiment of this application provides an uplink data splitting method. In the method, after determining that a timer expires, a terminal device determines, based on transmission capabilities of a long term evolution (long term evolution, LTE) link and a new radio (new radio, NR) link, a data amount of a data package transmitted on the LTE link and the NR link. The transmission capability of the LTE link is determined by the terminal device by transmitting a first detection data package on the LTE link before the timer expires. The transmission capability of the NR link is determined by the terminal device by transmitting a second detection data package on the NR link before the timer expires. The second detection data package is duplicated based on the first detection data package.

In this embodiment of this application, the terminal device sends a same data package to different communication links to detect transmission capabilities of the communication links. This avoids a phenomenon that data packages wait for each other, and does not affect normal transmission of a data service and user experience for a service. In addition, during data splitting, data packages of a specified data amount are transmitted on different communication links based on the detected transmission capabilities of the communication links, so that data transmission efficiency can be improved. This manner better adapts to a service requirement of a terminal device.

In a possible design, the terminal device receives first response information of the first detection data package, and determines the transmission capability of the LTE link based on the first response information, where the first response information includes a moment at which a radio link control protocol (radio link control, RLC) layer of a first network device receives the first detection data package. In addition, the terminal device receives second response information of the second detection data package, and determines the transmission capability of the NR link based on the second response information, where the second response information includes a moment at which an RLC layer of a second network device receives the second detection data package.

The terminal device may determine a transmission capability of a communication link by using response information fed back by an RLC layer of a network device, to better determine a capability of transmitting communication link data.

In a possible design, the transmission capability of the LTE link may be indicated by one of the following pieces of indication information: a transmission delay of the first detection data package on the LTE link; or a transmission rate of the first detection data package on the LTE link.

The transmission capability of the NR link may be indicated by one of the following pieces of indication information: a transmission delay of the second detection data package on the NR link. The transmission capability of the LTE link and the transmission capability of the NR link are indicated by indication information of a same measurement indicator.

A transmission capability of a communication link can be fed back more intuitively by using the indication information.

In a possible design, the first detection data package is one of the following data packages: a service data package generated in response to an operation performed by a user on an application of the terminal device; or a service request (service request, SR) package.

In this embodiment of this application, the detection data package may be a service data package generated in response to an operation performed by a user on an application of the terminal device, or may be an SR package (not an actual service data package). A transmission capability of a communication link is detected by using the detection data package provided in this application, so that a detection result of the communication link is more reliable.

In a possible design, the terminal device may determine an allocation rule for the data amount of the data package based on a proportional relationship between the transmission capability of the LTE link and the transmission capability of the NR link. Then, the terminal device transmits, according to the allocation rule, a data package of a corresponding data amount on the LTE link and the NR link.

In this application, after the transmission capabilities of the communication links are detected, the data amount of the data package to be transmitted on the communication links are allocated proportionally, so that data transmission efficiency can be improved.

In a possible design, the terminal device enables a data package duplication mechanism before determining that the timer expires, and the terminal device disables the data package duplication mechanism after determining that the timer expires.

By enabling the data package duplication mechanism, it can be ensured that the first detection data package and the second detection data package that are sent by the terminal device are data packages that are of a same type and include same information. By disabling the data package duplication mechanism, it can be ensured that the terminal device transmits different data packages on different communication links.

In a possible design, the terminal device determines a value of an ul-datasplit threshold in uplink data splitting parameters and an amount of data of the terminal device buffered at a packet data convergence protocol (packet data convergence protocol, PDCP) layer. Then, the terminal device allocates the data amount of the data package based on the value of the ul-datasplit threshold, the amount of buffered data, the transmission capability of the LTE link, and the transmission capability of the NR link.

In this manner, when uplink data splitting is performed, the value of the ul-datasplit threshold, the amount of data of the terminal device buffered at the PDCP layer, and the transmission capabilities of different communication links are considered, so that data transmission efficiency can be better improved in this manner.

According to a second aspect, an embodiment of this application provides a terminal device. The terminal device includes a processor and a computer storage medium, where the computer storage medium includes instructions, and when the processor executes the instructions, the terminal device is enabled to perform the foregoing method.

According to a third aspect, an embodiment of this application provides a chip system that is applied to a terminal device. The chip system includes an application processor and a baseband processor. The application processor is configured to generate a data package in response to a user operation. The baseband processor is configured to: after determining that a timer expires, determine, based on transmission capabilities of an LTE link and an NR link, a data amount of a data package transmitted on the LTE link and the NR link. The transmission capability of the LTE link is determined by the terminal device by transmitting a first detection data package on the LTE link before the timer expires. The transmission capability of the NR link is determined by the terminal device by transmitting a second detection data package on the NR link before the timer expires. The second detection data package is duplicated based on the first detection data package.

In a possible design, the baseband processor is further configured to: receive first response information of the first detection data package, and determine the transmission capability of the LTE link based on the first response information, where the first response information includes a moment at which an RLC layer of a first network device receives the first detection data package. In addition, the baseband processor is further configured to: receive second response information of the second detection data package, and determine the transmission capability of the NR link based on the second response information, where the second response information includes a moment at which an RLC layer of a second network device receives the second detection data package.

In a possible design, the transmission capability of the LTE link may be indicated by one of the following pieces of indication information: a transmission delay of the first detection data package on the LTE link; or a transmission rate of the first detection data package on the LTE link.

The transmission capability of the NR link may be indicated by one of the following pieces of indication information: a transmission delay of the second detection data package on the NR link; or a transmission rate of the second detection data package on the NR link. The transmission capability of the LTE link and the transmission capability of the NR link are indicated by indication information of a same measurement indicator.

In a possible design, the first detection data package is one of the following data packages: a service data package generated in response to an operation performed by a user on an application of the terminal device; or an SR package.

In a possible design, the baseband processor is configured to: determine an allocation rule for the data amount of the data package based on a proportional relationship between the transmission capability of the LTE link and the transmission capability of the NR link, and transmit, according to the allocation rule, a data package of a corresponding data amount on the LTE link and the NR link.

In a possible design, the baseband processor is further configured to: enable a data package duplication mechanism before determining that the timer expires, and disable the data package duplication mechanism after determining that the timer expires.

In a possible design, the baseband processor is further configured to: determine a value of an ul-datasplit threshold in uplink data splitting parameters and an amount of data of the terminal device buffered at a PDCP layer; and allocate the data amount of the data package based on the value of the ul-datasplit threshold, the amount of buffered data, the transmission capability of the LTE link, and the transmission capability of the NR link.

According to a fourth aspect, a terminal is further provided, including modules/units configured to perform the method in the first aspect or any possible design of the first aspect. The modules/units may be implemented by hardware, or may be implemented by hardware executing corresponding software.

According to a fifth aspect, a computer program product including instructions is further provided. When the computer program product runs on a computer, the computer is enabled to perform the method according to the first aspect.

According to a sixth aspect, a computer storage medium is further provided, including computer instructions. When the computer instructions are run on an electronic device, the electronic device is enabled to perform the method according to the first aspect.

For beneficial effects of the second aspect to the sixth aspect, refer to the beneficial effects of the first aspect. Details are not described again.

BRIEF DESCRIPTION OF THE DRAWINGS

FIG. 12 is a first schematic diagram of a process of uplink data splitting according to an embodiment of this application;

DETAILED DESCRIPTION OF ILLUSTRATIVE EMBODIMENTS

Figure 1:
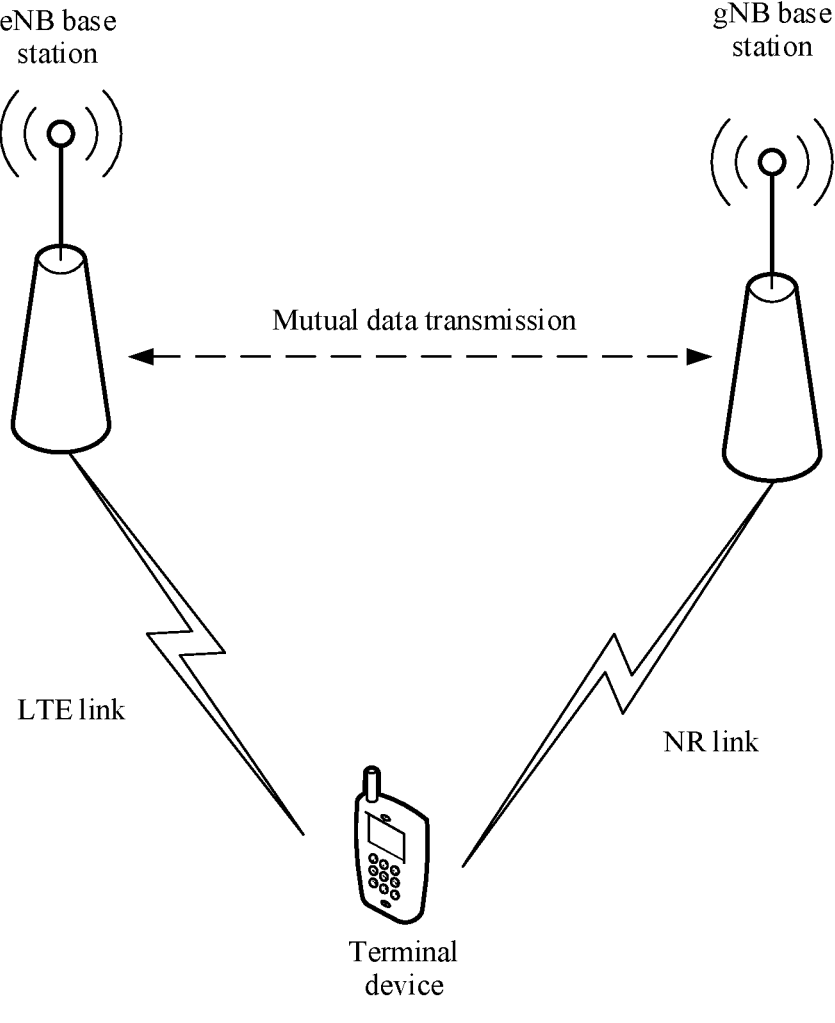
FIG. 1 is a schematic diagram of a dual-connectivity mode according to an embodiment of this application.

Before the solutions provided in this application are described, some terms provided in embodiments of this application are first explained and described, so that a person skilled in the art can understand the terms.

(1) A terminal in this application includes a device that provides a user with a voice and/or data connectivity, and may include, for example, a handheld device with a wireless connection function, or a processing device connected to a wireless modem. The terminal may communicate with a core network through the radio access network (radio access network, RAN), and exchange a voice and/or data with the RAN. The terminal may include user equipment (user equipment, UE), a wireless terminal, a mobile terminal, a subscriber unit (subscriber unit, SU), a subscriber station (subscriber station, SS), a mobile station, a mobile console, a remote station, an access point (access point, AP), a remote terminal, an access terminal, a user terminal, a user agent, a user apparatus, or the like. For example, the terminal may include a mobile phone (or referred to as a "cellular" phone), a computer having a mobile terminal, a portable, pocket-sized, handheld, or computer built-in mobile apparatus, or a smart wearable device. For example, the terminal device may be a device such as a personal communication service (personal communication service, PCS) phone, a cordless telephone, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

By way of example, and not limitation, in embodiments of this application, the terminal may alternatively be a wearable device. The wearable device may also be referred to as a wearable intelligent device, and is a general term for wearable devices such as glasses, gloves, a watch, clothes, and shoes that are developed by applying wearable technologies to intelligent designs of daily wear. The wearable device is a portable device that can be directly worn by a user or integrated into clothes or an accessory of a user. The wearable device is more than a hardware device. The wearable device implements powerful functions through software support, data exchange, and cloud interaction. In a broad sense, wearable intelligent devices include full-featured and large-sized devices that can implement all or a part of functions without depending on smartphones, for example, smart watches or smart glasses, and devices that focus on only one type of application function and need to collaboratively work with other devices such as smartphones, for example, various smart bands, smart helmets, or smart jewelry for monitoring physical signs.

If the various terminals described above are located on a vehicle (for example, placed in the vehicle or installed in the vehicle), the terminals may be considered as vehicle-mounted terminals. For example, the vehicle-mounted terminal is also referred to as an on-board unit (on-board unit, OBU).

In embodiments of this application, an apparatus configured to implement functions of the terminal may be a terminal device, or may be an apparatus, for example, a chip system, that can support the terminal device in implementing the functions. The apparatus may be installed in the terminal device. In embodiments of this application, the chip system may include a chip, or may include a chip and another discrete component. In the following, an example in which an apparatus configured to implement functions of the terminal is a terminal device is used for description.

(2) A network device in this application may be a device configured to communicate with the terminal device. In embodiments of this application, the network device may be referred to as a RAN device, for example, an access network (access network, AN) device or a base station (for example, an access point). Alternatively, the network device may be a device that communicates with a wireless terminal over an air interface in an access network by using one or more cells. Alternatively, for example, a network device in a vehicle to everything (vehicle to X, V2X) technology is a road side unit (road side unit, RSU). The base station may be configured to mutually convert a received over-the-air frame and an internet protocol packet and serve as a router between the terminal and a remaining part of the access network, where the remaining part of the access network may include an internet protocol (internet protocol, IP) network. The RSU may be a fixed infrastructure entity supporting a V2X application, and may exchange a message with another entity supporting the V2X application. The network device may further coordinate attribute management of the air interface. For example, the network device may include an evolved NodeB (evolved Node B, eNB) in an LTE system or a long term evolution-advanced (long term evolution-advanced, LTE-A) system, may include a next generation NodeB (next generation node B, gNB) in an NR system, or may include a centralized unit (centralized unit, CU) and a distributed unit (distributed unit, DU) in a cloud radio access network (cloud radio access network, Cloud RAN) system. This is not limited in embodiments of this application.

In embodiments of this application, an apparatus configured to implement a function of a network device may be a network device, or may be an apparatus, for example, a chip system, that can support the network device in implementing the function. The apparatus may be installed in the network device. In the following, an example in which an apparatus configured to implement a function of the network device is a network device is used for description.

(3) Terms "system" and "network" may be used interchangeably in embodiments of this application. The term "a plurality of" indicates two or more, and another quantifier is similar to this. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural. Singular expressions "one", "a", "the", "the foregoing", "this", and "the one" are also intended to include expressions such as "one or more", unless otherwise specified in the context clearly.

It should be noted that, in description of this application, words such as "first" and "second" are merely used for distinction and description, and cannot be understood as an indication or implication of relative importance or an indication or implication of an order. For example, the "first indication" and the "second indication" represent only two different indications, and does not represent a sequence or relative importance.

In addition, reference to "one embodiment" or "some embodiments" described in this specification of this application means that one or more embodiments of this application include a particular feature, structure, or characteristic described with reference to the embodiments. Therefore, in this specification, statements, such as "in an embodiment", "in some embodiments", "in some other embodiments", and "in other embodiments", that appear at different places in this specification do not necessarily mean reference to a same embodiment. Instead, the statements mean "one or more but not all of the embodiments", unless otherwise specifically emphasized. The terms "include", "comprise", "have", and their variants all mean "include but is not limited to", unless otherwise specifically emphasized.

(4) "Connection" in embodiments of this application means various connection manners such as a direct connection or an indirect connection, for implementing communication between devices. This is not limited in embodiments of this application.

To make the purpose, technical solutions, and advantages of this application clearer, the following describes the technical solutions of embodiments of this application in detail with reference to the accompanying drawings in embodiments of this application.

In a wireless system, when coordinated networking is performed on base stations or access points of different standards, a same standard, or different systems, because a bandwidth resource and coverage of a single base station are limited, radio resources of a plurality of cells or base stations are centralized to provide a service for a user. This satisfies a capacity requirement and a coverage requirement of the user more easily. Usually, this manner is referred to as multi-connectivity.

An LTE system is used as an example. Common multi-connectivity manners include carrier aggregation, coordinated multipoint transmission/reception (coordinated multipoint transmission/reception, CoMP), dual connectivity (dual connectivity, DC), and the like. Specifically, DC refers to an operation mode of a terminal device in a radio link control layer (radio resource control layer, RRC) connected mode. A master cell group (master cell group, MCG) and a secondary cell group (secondary cell group, SCG) are configured for the terminal device. This provides a performance solution under a non-ideal transmission condition between the base stations. It should be noted that, in this application, DC of the 4th generation mobile communication technology (4th generation mobile networks, 4G) LTE and a 5G new radio (new radio, NR) is used as an example, but is not limited to LTE and NR, and may also be between a plurality of different communication standards, for example, between 3G and 4G, or between 5G and 6G. As shown in FIG. 1, an LTE eNB base station and an NR gNB base station may transmit data to each other. UE may send data to the eNB base station through an LTE link, or the UE may send the data to the gNB base station through an NR link.

Figure 2:
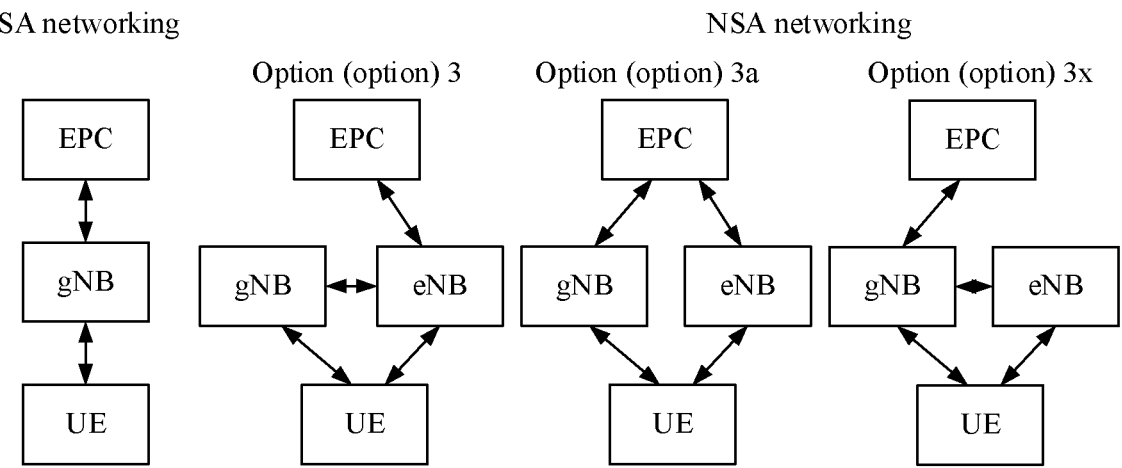
FIG. 2 is a schematic diagram of a SA networking architecture and an NSA networking architecture according to an embodiment of this application.

In an existing 5G standard, a plurality of types of networking manners are defined, including a standalone (standalone, SA) networking manner and a non-standalone (non-standalone, NSA) networking manner. FIG. 2 shows a schematic diagram of a SA networking architecture and an NSA networking architecture. The SA networking is simple. An NR base station is directly connected to a core network (for example, a 5G core network). In an uplink direction, a terminal sends uplink data to the NR base station, and the NR base station sends the uplink data to the core network. In a downlink direction, the core network sends downlink data to the NR base station, and the NR base station sends the downlink data to the terminal. The NSA networking may have a plurality of types of networking manners, for example, a plurality of types of possible manners such as Option 3/3a/3x, Option 4/4a, and Option 7/7a/7x. In FIG. 2, Option 3/3a/3x is used as an example. A 4G base station (eNB) is a primary base station, a 5G base station (gNB) is a secondary base station, an LTE core network is still used, a new 5G core network is not required, and all control plane signaling is forwarded by the eNB. Data stream is transmitted in the following three manners: The eNB may split data to the gNB (that is, Option 3); the LTE core network (evolved packet core, EPC) splits data to the gNB (that is, Option 3*a*); or the gNB may split data to the eNB (that is, Option 3*x*). In this scenario, the eNB is the primary base station, and all control plane signaling is forwarded by the eNB. The LTE eNB and the NR gNB provide a high data rate service for a user in a dual connectivity form. Option 4/4*a* is used as an example. Option 4 introduces both an NGC (Next Generation Core) and a gNB. However, the gNB does not directly replace an eNB. In this scenario, the core network uses a 5G NGC, and both the eNB and the gNB are connected to the NGC. All control plane signaling is forwarded by the gNB. Data stream is transmitted in the following two manners: The gNB splits data to the eNB; or the NGC splits data to the eNB.

The foregoing merely provides several common DC connection manners as examples. This is not limited in this application.

It should be noted that DC in a 4G-5G standard indicates that UE maintains dual connectivity to both a 4G base station and a 5G base station, and simultaneously performs service transmission by using radio resources of the two base stations. In DC, data transmission may be performed in a split (split) bearer manner (which may also be referred to as a data splitting manner). The primary station bears a control plane, and the primary station and the secondary station may bear data. Based on distribution of the data on the primary station and the secondary station, there may be the following four DC bearer types:

a. an MCG bearer (data is transmitted only on the primary station);

b. an SCG bearer (data is transmitted only on the secondary station);

c. an MCG split bearer (data is split at the primary station); and d. an SCG split bearer (data is split on the secondary station).

Figure 3:
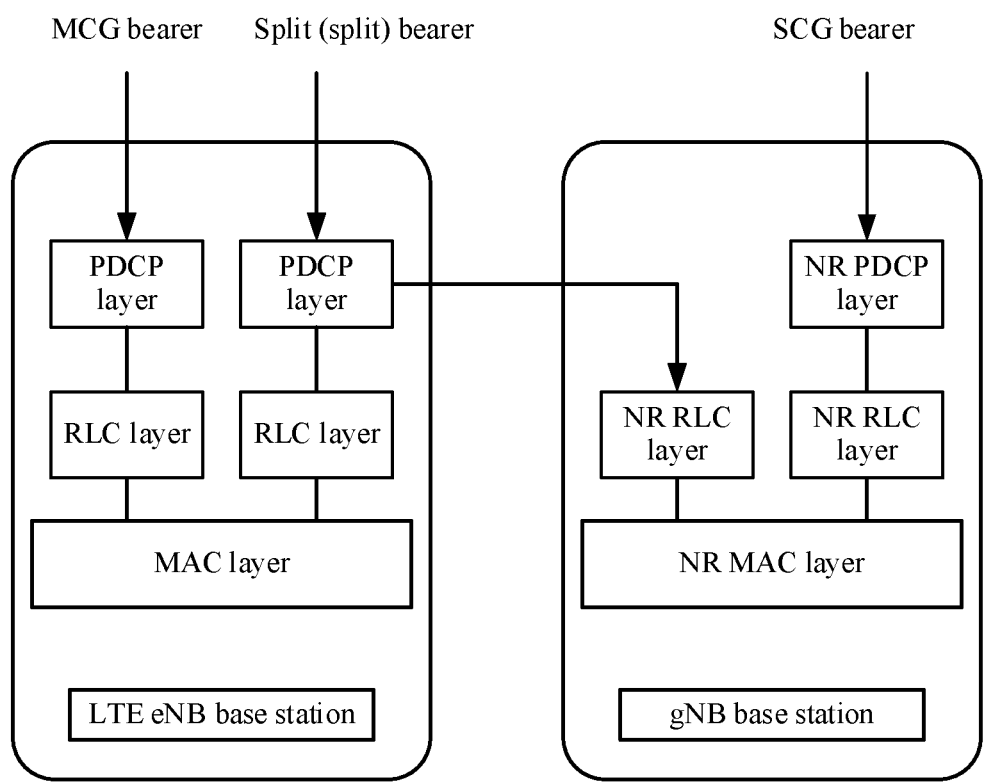
FIG. 3 is a first schematic diagram of data splitting according to an embodiment of this application.

As shown in FIG. 3, in dual connectivity, downlink data transmission is used as an example. Data streams are separated and combined at a PDCP layer, and then the data streams are simultaneously transmitted to a terminal device by using a plurality of base stations. In this case, one PDCP entity may be associated with two RLC entities. This may be understood as follows: The PDCP layer transmits data streams to an RLC layer by using an RLC1 entity link and an RLC2 entity link. Specifically, the RLC1 link may be understood as an LTE link, and the RLC2 link may be understood as an NR link. The RLC entities respectively correspond to an LTE air interface and an NR air interface. In this scenario, a PDCP packet is separately sent over the LTE air interface and the NR air interface based on authorization obtained by the data streams at the PDCP layer. This manner may be referred to as the MCG split bearer mode. Similarly, if the PDCP layer is associated with only one RLC entity, data at the PDCP layer is directly transmitted to the RLC layer. This manner is referred to as the MCG bearer (data is transmitted only on the primary station). Similarly, if data is transmitted on data at the NR PDCP layer in this case, that is, the data is transmitted on the secondary station, only one NR RLC entity is associated in this case, that is, the data at the NR PDCP layer is directly transmitted to the NR RLC layer. This manner is referred to as the SCG bearer (data is transmitted only on the secondary station).

Figure 4:
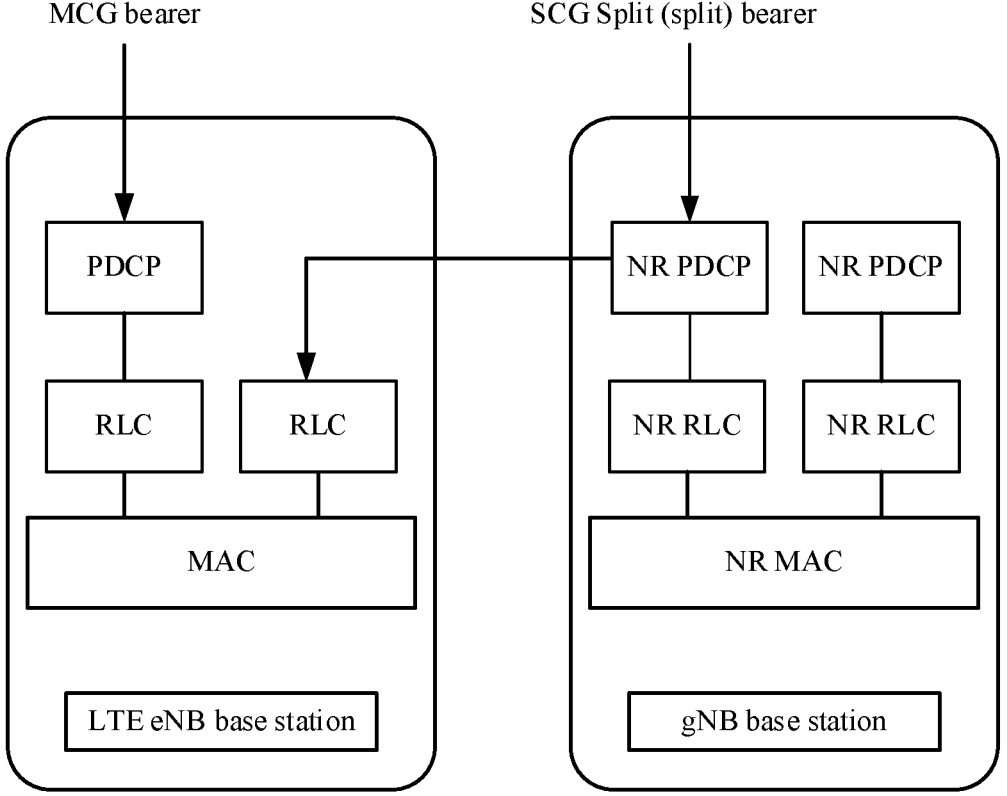
FIG. 4 is a second schematic diagram of data splitting according to an embodiment of this application.

In some embodiments, each RLC entity may correspond to at least one bearer link. In some embodiments, there may be a plurality of RLC entities at the RLC layer. As shown in FIG. 4, an LTE eNB is a primary station, and a gNB is a secondary station. Data is converged at an NR PDCP layer. One NR PDCP entity may be associated with two RLC entities, and the two entities correspond to the NR RLC layer and the RLC layer. In this case, data is split on a secondary bearer. This manner is referred to as the SCG split bearer (data is split on the secondary station). In this case, to avoid the bottleneck of the processing capability of a 4G base station, an upgrade of an original 4G base station is minimized, and research and development costs and network construction costs are reduced as much as possible. The LTE-NR dual connectivity can also be performed in the SCG split bearer manner. In other words, downlink data streams can be transmitted from a 5G secondary station to a 4G primary station and then to a mobile phone.

Figure 5:
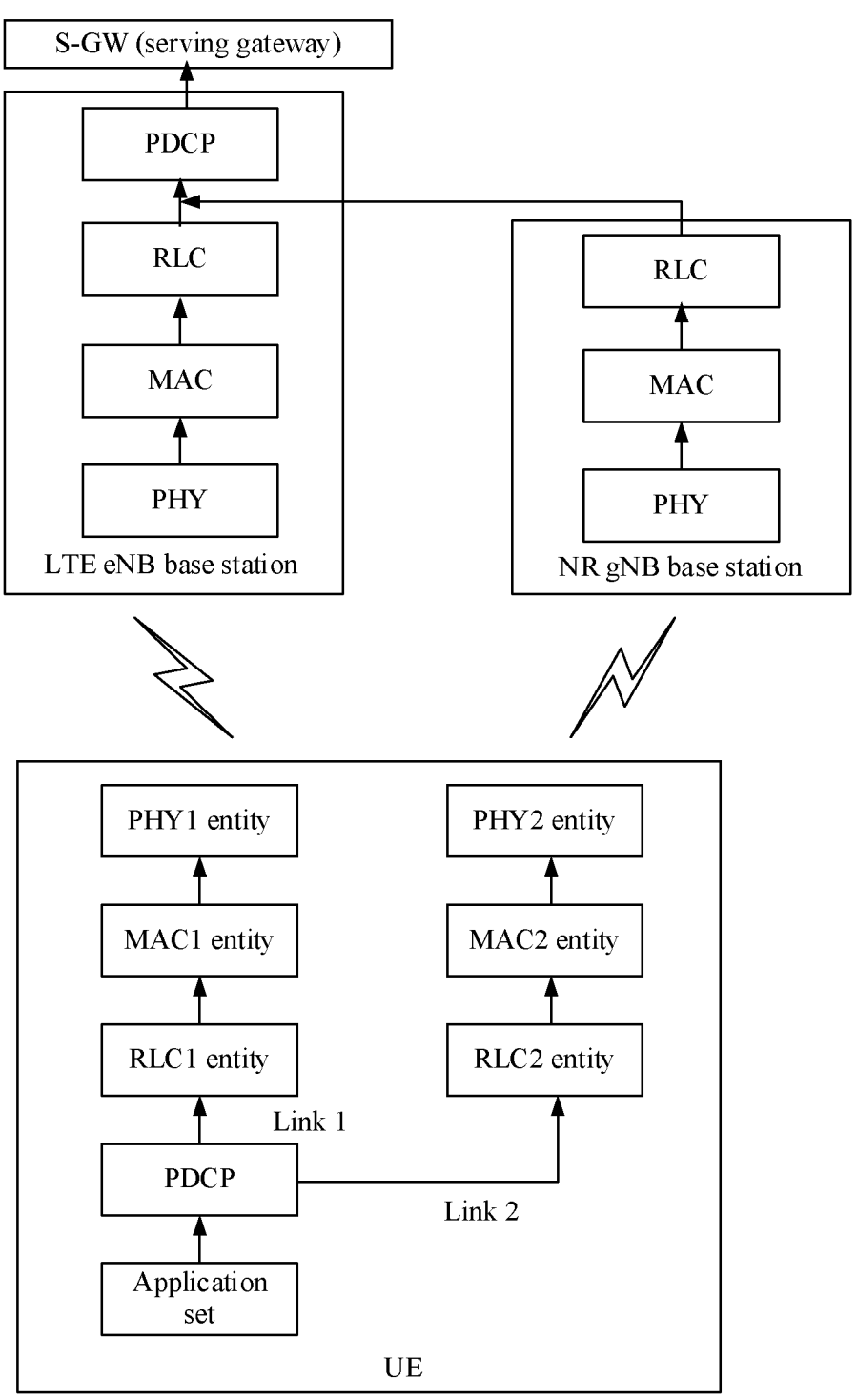
FIG. 5 is a third schematic diagram of data splitting according to an embodiment of this application.

As shown in FIG. 5, during uplink data transmission, after data streams are converged at a PDCP layer, splitting and transmission may be performed according to a specific predefined policy. In some embodiments, data streams may be evenly allocated to two links. In some embodiments, the data streams may be transmitted to two links based on link quality. In some embodiments, if a value of a data stream transmitted at the PDCP layer is less than a threshold for splitting transmission, the data stream is transmitted on a primary bearer, for example, a link 1 shown in FIG. 5. It should be noted that the link 1 and a link 2 in the figure are for ease of description, and are not intended to limit this application.

In some implementations, there may be a plurality of entities at one layer. For example, there may be two RLC entities at an RLC layer and the two entities correspond to two bearer links. This is not limited in this application.

UE in this application may be an electronic device of any application type used by a consumer. Examples of the user equipment include but are not limited to: a smartphone, a tablet computer, a television, a projector, a smart watch, smart glasses (for example, Google glasses), a wearable accessory (for example, a smart wristwatch, a T-shirt, a necklace, or shoes), a media (for example, music and/or video) player, a game player, a game console and controller, an e-book reader, a cloud terminal, or a vehicle-mounted media system. The user equipment may be a wearable device (for example, a smart watch or smart glasses) or a non-wearable device (for example, a television or a tablet computer). In addition, the user equipment may have any suitable operating system (OS), for example, Android, iOS, Windows, Linux, or Unix. Further, the user equipment may support a plurality of mobile communication technologies of different standards, including 2G/3G/4G/5G, and may further support wireless fidelity (wireless fidelity, Wi-Fi), Bluetooth, and the like.

As shown in FIG. 5, in some embodiments, it may be understood as follows: An RLC layer includes an RLC1 entity and an RLC2 entity, where the RLC1 entity supports LTE data transmission, and the RLC2 entity supports NR data transmission. A media access control (media access control, MAC) layer includes a MAC1 entity and a MAC2 entity, where the MAC1 entity supports LTE data transmission, and the MAC2 entity supports NR data transmission. A physical (physical, PHY) layer includes a PHY1 entity and a PHY2 entity, where the PHY1 entity supports LTE data transmission, and the PHY2 entity supports NR data transmission. However, this is not limited in this application. Uplink data is used as an example. When upper-layer data is transmitted to the PDCP layer, data packets of the upper-layer data have serial numbers (serial number, SN). It may be understood as follows: SNs are added to the data when the data is transmitted to the PDCP layer. In a normal case, downlink PDCP data packets arrive in ascending order of SNs. If PDCP packets received by a receive end are consecutive in numbers, the receive end directly delivers the PDCP packets to an upper-layer application.

In a split mode, when upper-layer data is transmitted to the PDCP layer, the PDCP layer needs to split the data. In some cases, for example, if quality of a link is poor, to-be-transmitted PDCP packets cannot be transmitted to a peer end in time. In this case, a receive end cannot obtain consecutive PDCP data packages, and accordingly, a problem that another link waits for PDCP packets occurs. Conversely, if quality of the another link is poor, the same problem occurs.

It should be noted that signal quality of a communication link, a communication bandwidth of the communication link, and a quantity of other network users (users who transmit data through the communication link) on the communication link all affect a data transmission capability of the communication link. To enable a terminal device to obtain a good data transmission rate in an NSA network, after detecting transmission capabilities of an LTE link and an NR link, the terminal device may allocate data packages based on the transmission capabilities of the communication links, to increase a data transmission rate.

The following describes a communication link detection process in the following three cases.

Case 1: The transmission capabilities of the communication links are detected by using different service data packages.

Figure 6:
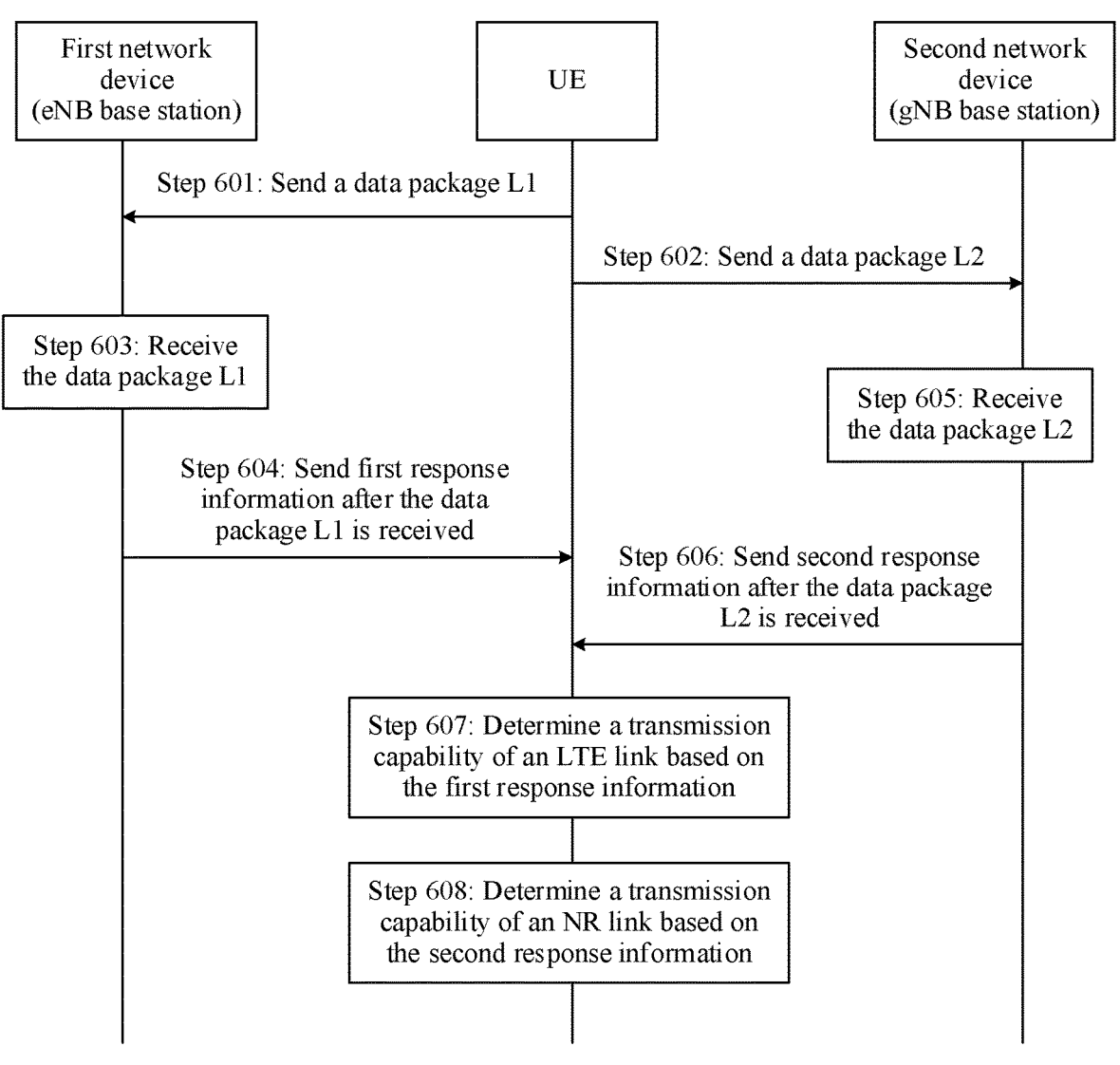
FIG. 6 is a first schematic diagram of communication link transmission capability detection according to an embodiment of this application.

FIG. 6 shows a process in which UE detects transmission capabilities of communication links. The UE may divide service data at a PDCP layer into a data package L1 and a data package L2, and respectively transmit the data package L1 and the data package L2 on an LTE link and an NR link. For example, data packages at the PDCP layer include to-be-uploaded pictures, video data, audio data, and text documents. Before sending the data packages to a network device, the UE may divide the data into 100 sub-data packages, and sequentially number the sub-data packages. During data transmission, the UE sends different sub-data packages on the LTE link and the NR link, to implement detection of the transmission capabilities of the communication links. Herein, sub-data packages numbered 1 to 10 are used as examples to describe how to perform detection. The data package L1 may include: a sub-data package 1, a sub-data package 3, a sub-data package 5, a sub-data package 7, and a sub-data package 9. The data package L2 may include: a sub-data package 2, a sub-data package 4, a sub-data package 6, a sub-data package 8, and a sub-data package 10. In addition, how to allocate a quantity or sizes of sub-data packages in the data package L1 and the data package L2 is not specifically limited herein. The sub-data packages may be allocated based on signal quality and transmission delays of the communication links, or may be randomly allocated, provided that content of sub-data packages in the data package L1 is inconsistent with content of sub-data packages in the data package L2. For example, the data package L1 may include sub-data packages 1 to 4, and the data package L2 includes sub-data packages 5 to 10. In addition, a data amount of each sub-data package in the data package L1 and the data package L2 is not specifically limited herein either. Therefore, a data amount of the data package L1 used to detect the transmission capabilities of the communication links may be 1 Mbit, and a data amount of the data package L2 may be 3 Mbits. Alternatively, a data amount of the data package L1 and a data amount of the data package L2 are both 2 Mbits.

Figure 7:
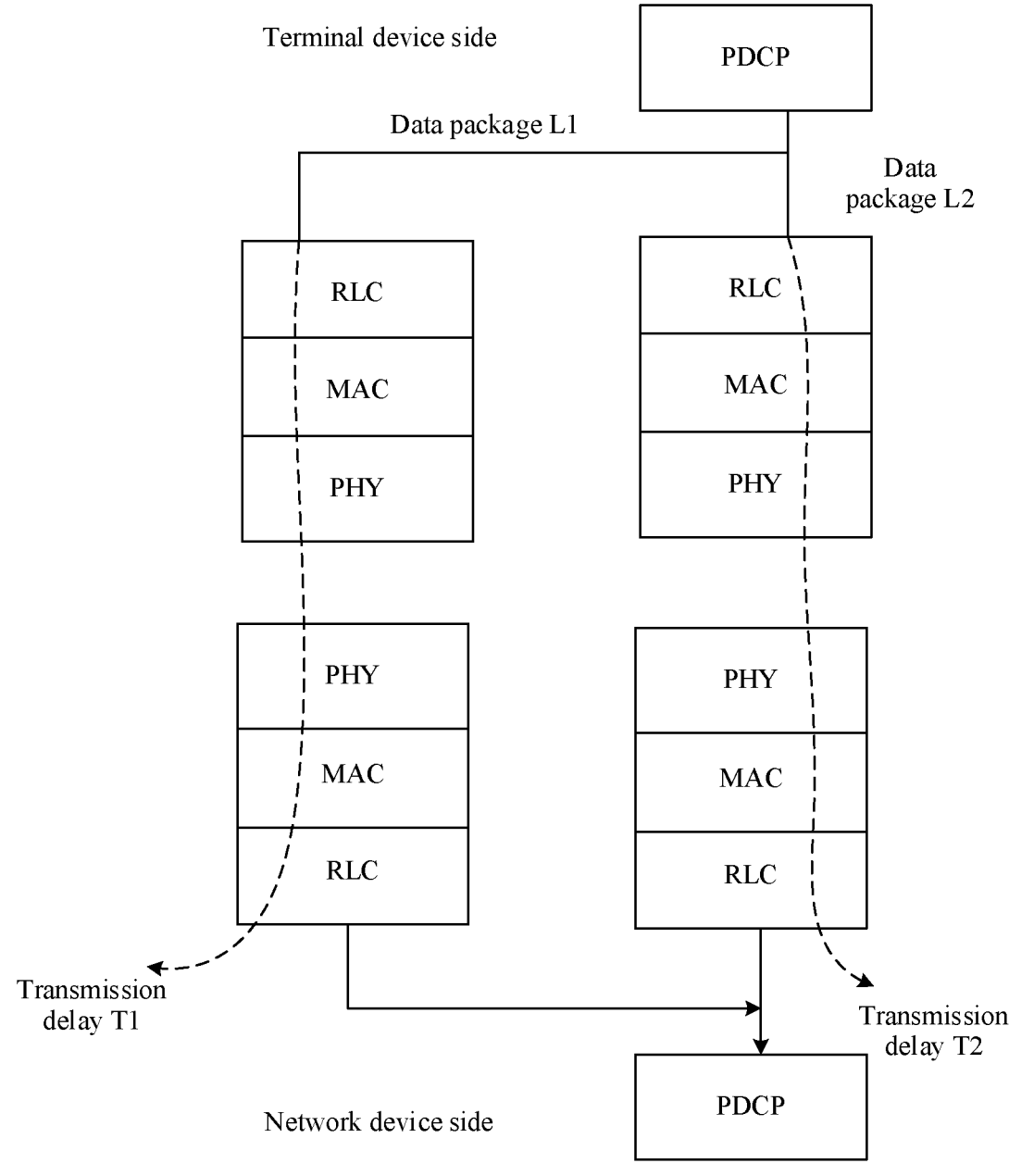
FIG. 7 is a schematic flowchart of data transmission according to an embodiment of this application.

Further, after being sequentially transmitted in an RLC entity, a MAC entity, and a PHY entity of the LTE link on a UE side, the data package L1 arrives at a first network device (an LTE base station). On the LTE link of the first network device, the data package L1 is sequentially parsed in a PHY entity, a MAC entity, and an RLC entity. After being sequentially transmitted in an RLC entity, a MAC entity, and a PHY entity of the NR link on the UE side, the data package L2 arrives at a second network device (an NR base station). On the NR link of the second network device, the data package L2 is sequentially parsed in a PHY entity, a MAC entity, and an RLC entity. When the data package L1 arrives at an RLC layer of the LTE link on a first network device side, an arrival moment of the data package L1 is fed back. Similarly, when the data package L2 arrives at an RLC layer of the NR link on a second network device side, an arrival moment of the data package L2 is also fed back. The UE easily determines the transmission capability of the LTE link based on a sending moment of the data package L1 and a moment at which the first network device receives the data package L1. Similarly, the UE may also determine transmission capability of the NR link. As shown in FIG. 7, the transmission capability of the LTE link may be represented by using a transmission delay T1 or a transmission rate V1 of the RLC layer of the first network device, and the transmission capability of the NR link may be represented by using a transmission delay T2 or a transmission rate V2 of the RLC layer of the second network device. Alternatively, the transmission capability may be indicated by using another parameter. This is not specifically limited herein. For example, if it takes the data package L1 is to arrive at the RLC layer of the first network device, a transmission delay of the LTE link is 1 s. If it takes the data package L1 5 s to arrive at the RLC layer of the second network device, a transmission delay of the NR link is 5 s. Therefore, it can be learned that the transmission capability of the LTE link is stronger than the transmission capability of the NR link, and is approximately five times the transmission capability of the NR link. Alternatively, if a tested rate of the data package L1 at the RLC layer of the first network device is 0.5 Mbps, a transmission rate on the LTE link is 0.5 Mbps. If a tested rate of the data package L1 at the RLC layer of the second network device is 0.1 Mbps, a transmission rate on the NR link is 0.1 Mbps. Therefore, it can be learned that the transmission capability of the LTE link is higher than the transmission capability of the NR link, and is about five times the transmission capability of the NR link. The transmission capability of the LTE link and the transmission capability of the NR link are indicated by indication information of a same measurement indicator. In other words, the transmission capabilities of the communication links are both measured by using transmission delays, or the transmission capabilities of the communication links are both measured by using transmission rates. Specifically, the following steps may be performed.

Step 601: UE sends a data package L1 to a first network device on an LTE link.

Step 602: The UE sends a data package L2 to a second network device on an NR link.

Step 603: The first network device receives the data package L1.

Step 604: After receiving the data package L1, the first network device sends first response information to the UE, where the first response information may be information about a moment at which the data package L1 arrives at an RLC layer of the first network device.

Step 605: The second network device receives the data package L2.

Step 606: After receiving the data package L2, the second network device sends second response information to the UE, where the second response information may be information about a moment at which the data package L2 arrives at an RLC layer of the second network device.

Step 607: The UE determines a transmission capability of the LTE link based on the first response information.

Step 608: The UE determines a transmission capability of the NR link based on the second response information.

In addition, it should be noted that step 601 and step 602 are not performed in sequence, and step 607 and step 608 are not performed in sequence. In addition, steps performed by the first network device and steps performed by the second network device are not performed in sequence, and may be performed simultaneously. Alternatively, steps on a first network device side may be first performed, and then steps on a second network device side are performed; or steps on a second network device side may be first performed, and then steps on a first network device side are performed.

It should be noted that when data transmission capabilities (for example, transmission delays) of the LTE link and the NR link are inconsistent, a data package is transmitted at a slower speed on a link with a longer transmission delay, and accordingly, it takes a longer time period for the data package to arrive at a network device. Therefore, when the service data packages sent by the UE arrive at the network devices, the data packages may wait for each other. In addition, data package reordering consumes a large amount of time. Consequently, a service delay is long, and user experience for a service is poor. Therefore, a data package allocation rule cannot actually match a transmission capability of a link, and user experience for a service may be reduced. The following provides descriptions by using specific examples.

For example, a PDCP entity of the UE includes service data 1, and the service data 1 is divided into a sub-data package 1 and a sub-data package 2. The UE transmits a 100-kbit data package L1 (the data package L1 includes only the sub-data package 1) on the LTE link, and transmits a 200 Kbit data package L2 (the data package L2 includes only the sub-data package 2) on the NR link. If the transmission capability of the LTE link is stronger than the transmission capability of the NR link, the data package L1 arrives at an eNB base station after 20 ms, and the data package L2 arrives at a gNB base station after 50 ms. The gNB base station transmits the data package L2 to the eNB base station. The data package L1 and the data package L2 are reordered at a PDCP layer of the eNB base station, and the reordered data is delivered to another network device, so that the another network device obtains the service data 1. In this manner, it may take the another network device longer than 50 ms to finally obtain the service data 1. However, if the communication links on which the data package L1 and the data package L2 are transmitted are exchanged, it may take the another network device a shorter time period to obtain the service data 1. Therefore, in this manner, data transmission capabilities of communication links are detected by randomly allocating data packages for transmission on the communication links. Although data transmission capabilities of different links can be detected, the transmission capabilities of the links cannot be actually matched, and user experience for a service is affected.

Case 2: The transmission capabilities of the communication links are detected by using same actual service data packages.

Figure 8:
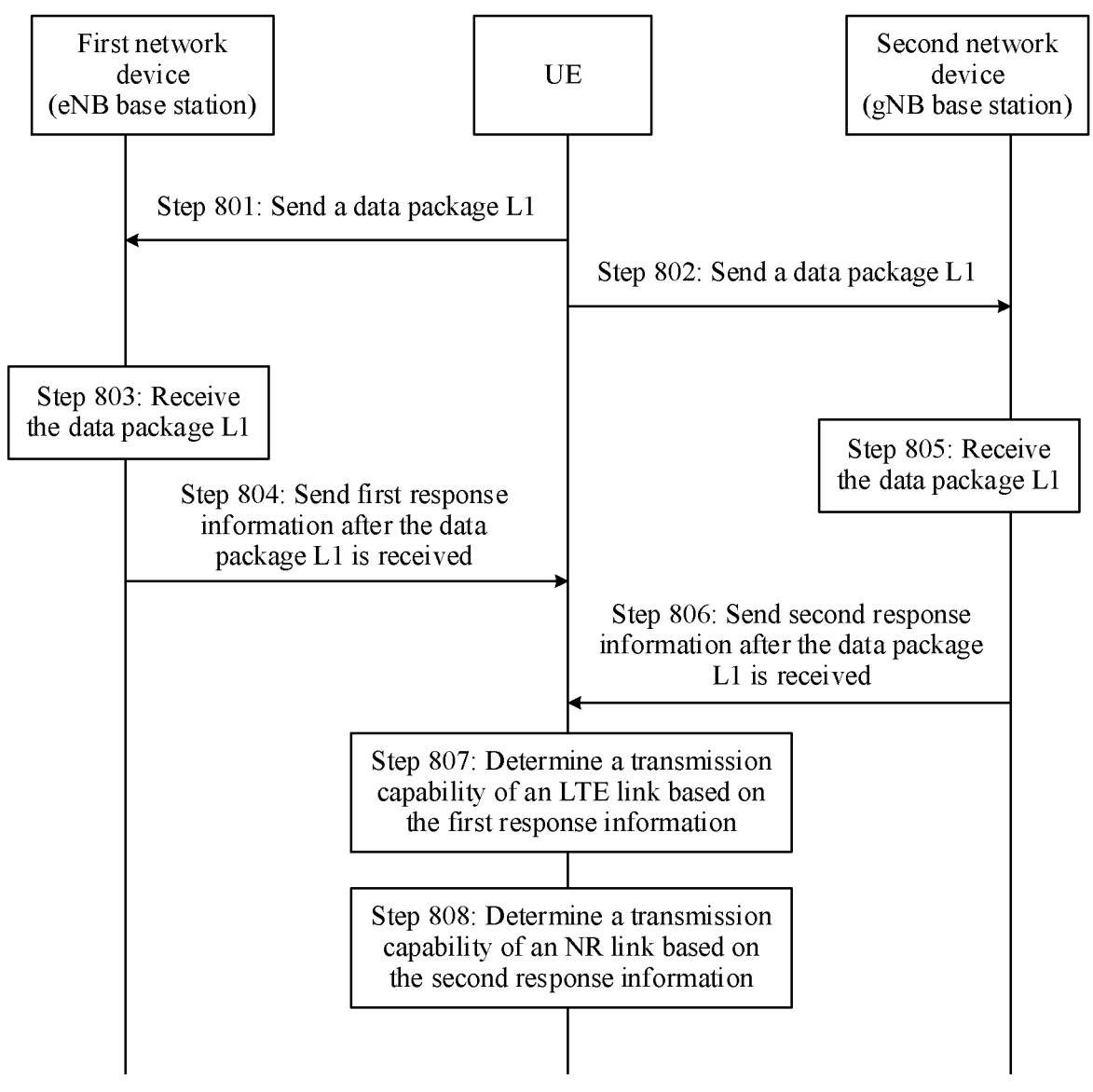
FIG. 8 is a second schematic diagram of communication link transmission capability detection according to an embodiment of this application.

Considering the foregoing problem that occurs when the transmission capabilities of the communication links are detected, when detecting the data transmission capabilities, the UE in this application may detect the transmission capabilities of the communication links based on actual service data packages including same information, as shown in FIG. 8. The actual service data package is a service data package generated in response to an operation performed by a user on an application of the UE, for example, a video data package generated by the UE in response to a video uploading operation performed by the user on an application through tapping, or a picture data package generated by the UE in response to a picture uploading operation performed by the user on an application through tapping. The UE transmits same data packages on the LTE link and the NR link. In other words, the data package L1 is transmitted on the LTE link, and a same data package L1 is also transmitted on the NR link. It should be noted that the same data packages L1 transmitted on the different communication links may be obtained through duplication. For example, data is buffered at a PDCP layer of the UE. It is assumed that the data is divided into 10 sub-data packages. The 10 sub-data packages may be used as the data package L1, and are separately transmitted on the LTE link and the NR link.

Further, after the data package L1 on the LTE link of the first network device arrives at the RLC layer, an arrival moment of the data package L1 is fed back. Similarly, when the data package L1 arrives at the RLC layer of the NR link of the second network device, an arrival moment of the data package L1 is also fed back. The UE easily determines the transmission capability of the LTE link based on a sending moment of the data package L1 and a moment at which the first network device receives the data package L1. Similarly, the UE may also determine the transmission capability of the NR link.

In addition, no matter which network device first receives the data package L1, demodulation is performed immediately after the data package L1 is received. When a data package L1 is received again, the data package L1 is directly discarded. For example, the UE transmits a 1-Mbit data package L1 on the LTE link, and transmits a 1-Mbit data package L1 on the NR link. However, the transmission capability of the LTE link is higher than the transmission capability of the NR link. The data package L1 arrives at the first network device after 0.6 s, and the data package L1 arrives at the second network device after 0.2 s. In this case, the first network device directly discards the data package L1. Therefore, it takes the first network device about 0.2 s to obtain the service data. Specifically, reference may be made to the following steps for execution.

Step 801: UE sends a data package L1 to a first network device on an LTE link.

Step 802: The UE sends a data package L1 to a second network device on an NR link.

Step 803: The first network device receives the data package L1.

Step 804: After receiving the data package L1, the first network device sends first response information to the UE, where the first response information may be information about a moment at which the data package L1 arrives at an RLC layer of the first network device.

Step 805: The second network device receives the data package L1.

Step 806: After receiving the data package L1, the second network device sends second response information to the UE, where the second response information may be information about a moment at which the data package L2 arrives at an RLC layer of the second network device.

Step 807: The UE determines a transmission capability of the LTE link based on the first response information.

Step 808: The UE determines a transmission capability of the NR link based on the second response information.

Data transmission may be performed between the first network device and the second network device. Therefore, either the first network device or the second network device directly demodulates the data package L1 after receiving the data package L1, and directly discards a data package L1 that is received again.

In addition, it should be noted that step 801 and step 802 are not performed in sequence, and step 807 and step 808 are not performed in sequence. In addition, steps performed by the first network device and steps performed by the second network device are not performed in sequence, and may be performed simultaneously. Alternatively, steps on a first network device side may be first performed, and then steps on a second network device side are performed; or steps on a second network device side may be first performed, and then steps on a first network device side are performed.

In this manner, the terminal device can detect the data transmission capabilities of the two communication links, and normal transmission of a data service and user experience for a service are not affected.

Case 3: The transmission capabilities of the communication links are detected by using SR packages.

Considering that user experience for a service may be affected during detection when detection is performed by using actual service data packages, this application further proposes to detect the transmission capabilities of the communication links by using SR packages. The SR package is not a service that the UE intends to obtain, and is only a virtual service data package used to detect data transmission capabilities of different communication links. When transmission capability detection is performed on a communication link, same SR packages may be transmitted on different communication links, or different SR packages may be transmitted. For example, an SR1 is transmitted on the LTE link, and an SR1 is also transmitted on the NR link. Alternatively, an SR2 is transmitted on the LTE link, and an SR1 is transmitted on the NR link. Types and a quantity of SR packages specifically transmitted on the different communication links are not specifically limited herein. Any solution in which an SR package is used to detect a transmission capability of a communication link is applicable to the protection scope of this application.

For example, this application provides descriptions by using an example in which same SR packages are transmitted on the LTE link and the NR link. Execution may be performed with reference to steps shown in FIG. 9.

Step 901: UE sends an SR1 to a first network device on an LTE link.

Step 902: The UE sends an SR1 to a second network device on an NR link.

Step 903: The first network device receives the SR1.

Step 904: After receiving the SR1, the first network device sends first response information to the UE, where the first response information may be information about a moment at which the SR1 arrives at an RLC layer of the first network device.

Step 905: The second network device receives the SR1.

Step 906: After receiving the SR1, the second network device sends second response information to the UE, where the second response information may be information about a moment at which the SR1 arrives at an RLC layer of the second network device.

Step 907: The UE determines a transmission capability of the LTE link based on the first response information.

Step 908: The UE determines a transmission capability of the NR link based on the second response information.

Data transmission may be performed between the first network device and the second network device. Therefore, either the first network device or the second network device directly demodulates the SR1 after receiving the SR1, and directly discards an SR1 that is received again.

In addition, it should be noted that step 901 and step 902 are not performed in sequence, and step 907 and step 908 are not performed in sequence. In addition, steps performed by the first network device and steps performed by the second network device are not performed in sequence, and may be performed simultaneously. Alternatively, steps on a first network device side may be first performed, and then steps on a second network device side are performed; or steps on a second network device side may be first performed, and then steps on a first network device side are performed.

When the transmission capabilities of the communication links are detected by using virtual service data packages SR, data transmission experience of executing an actual service by the terminal device is not affected.

Figure 9:
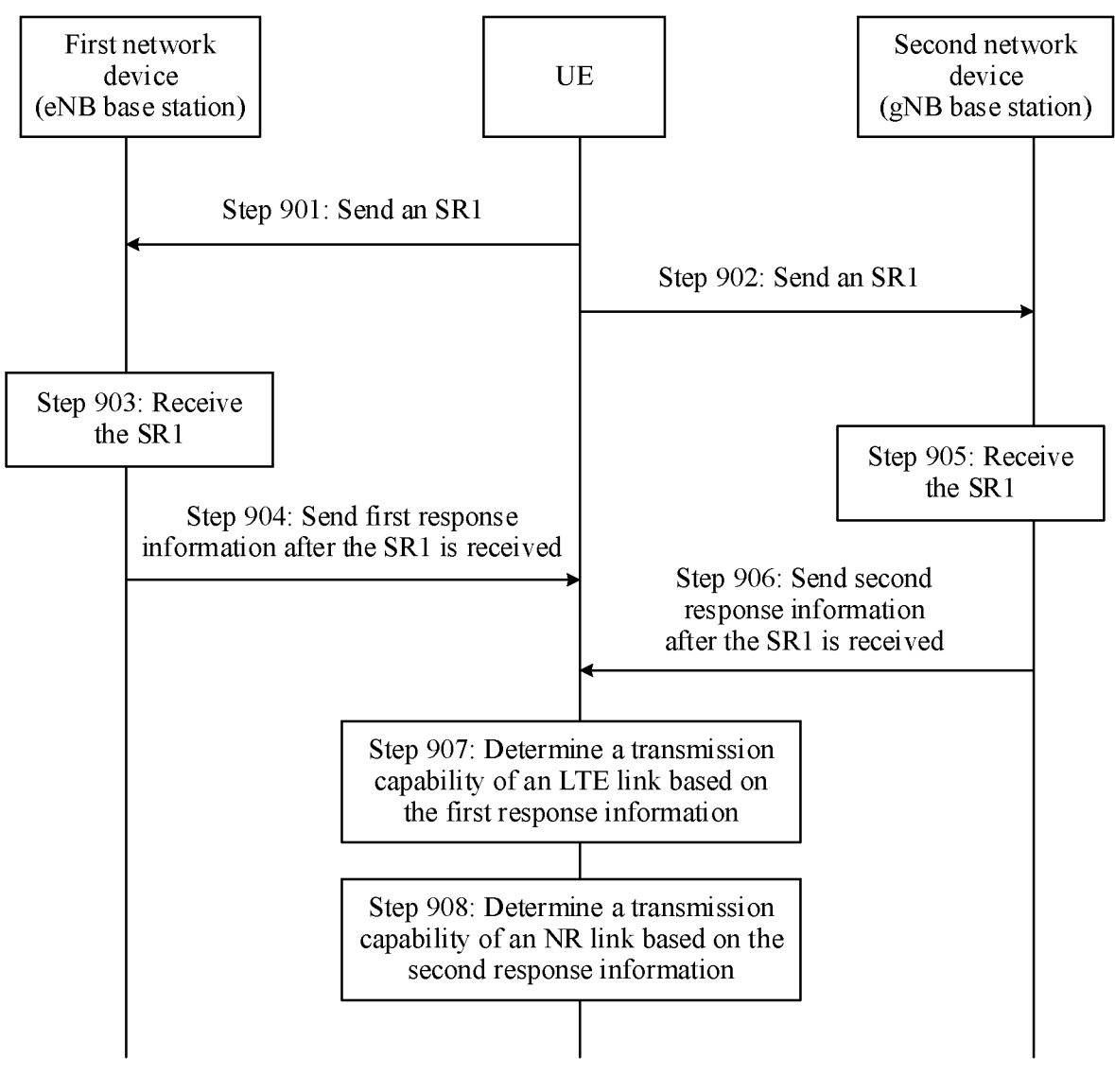
FIG. 9 is a third schematic diagram of communication link transmission capability detection according to an embodiment of this application.
Figure 10:
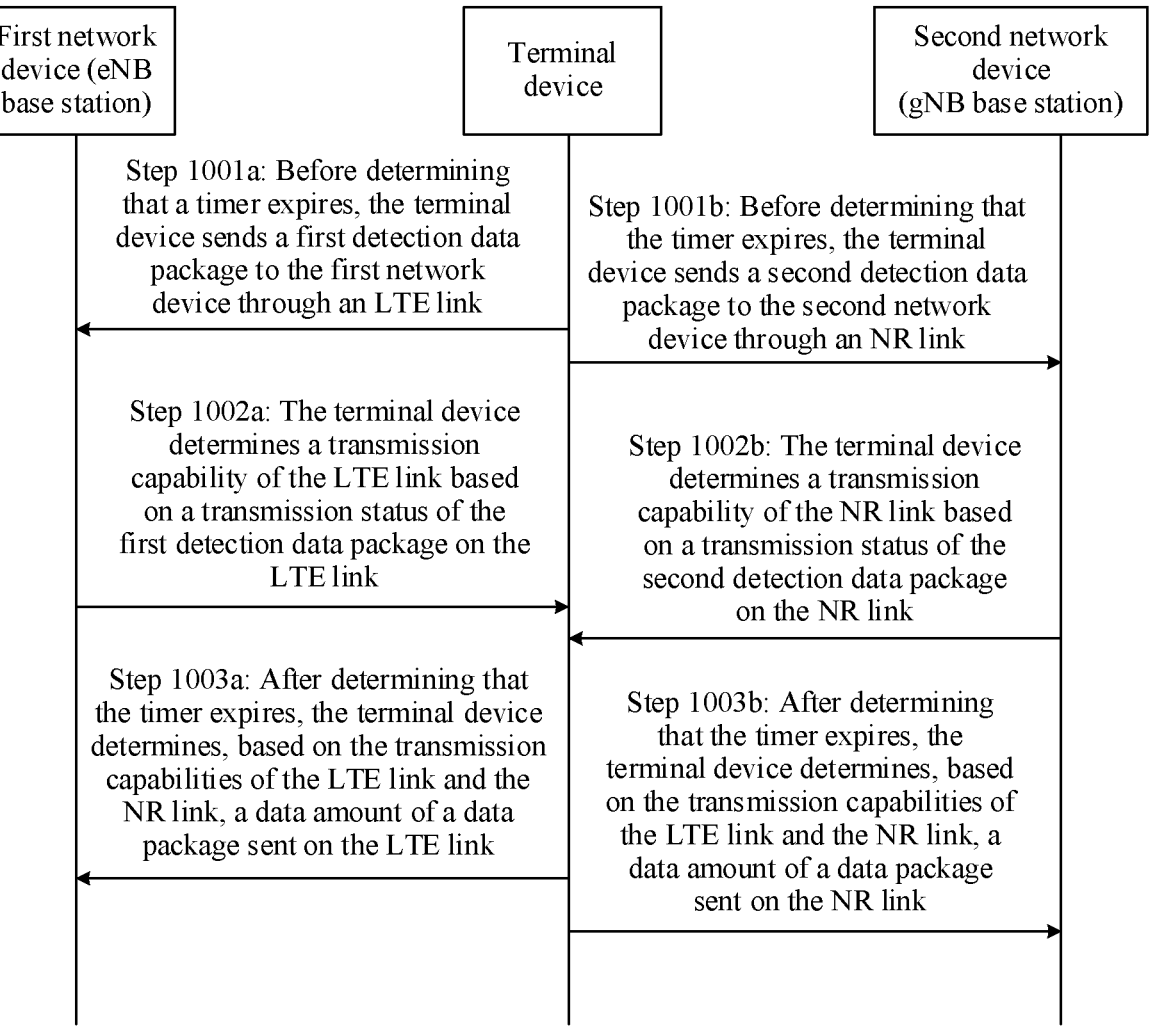
FIG. 10 is a schematic flowchart of uplink data splitting according to an embodiment of this application.

Based on the solution in which the UE detects the data transmission capability shown in FIG. 8 or FIG. 9, the terminal device may perform the following steps to perform uplink splitting, as shown in FIG. 10.

Step 1001a: Before determining that a timer expires, a terminal device sends a first detection data package to a first network device on an LTE link.

Step 1001b: Before determining that the timer expires, the terminal device sends a second detection data package to a second network device on an NR link. The second detection data package is obtained through duplication based on the first detection data package.

It should be noted that the timer is configured to record a time period for which the terminal device performs data transmission capability detection. Before the timer expires, all data packages sent by the terminal device are used to detect the data transmission capabilities of the communication links. Generally, timing duration of the timer is 10 s to 15 s. However, different terminal devices have inconsistent device performance. Therefore, the duration is not fixed. A specific value of the timing duration of the timer is not limited herein in this application. A specific value of the timing duration needs to be determined based on performance of the terminal device. After the timer expires, the terminal device has obtained the data transmission capabilities of the communication links, and may allocate a data amount of service data based on the data transmission capabilities of the communication links, to improve user experience for communication rates.

In addition, the first detection data package and the second detection data package include same information. It should be noted that, if a large quantity of sub-data packages are buffered at the PDCP layer of the terminal device, the first detection data package is not only limited to one sub-data package of a plurality of actual service sub-data packages that are buffered at the PDCP layer. The first detection data package may alternatively be a plurality of sub-data packages. In addition, the first detection data package may alternatively be an SR package. Reference may be made to the foregoing description, and details are not described herein again. For example, 100 sub-data packages are buffered at the PDCP layer of the terminal device. The first detection data package may be one of the sub-data packages, or may be 10 of the sub-data packages. A quantity of sub-data packages in the first detection data package is not limited herein.

Figure 11A:
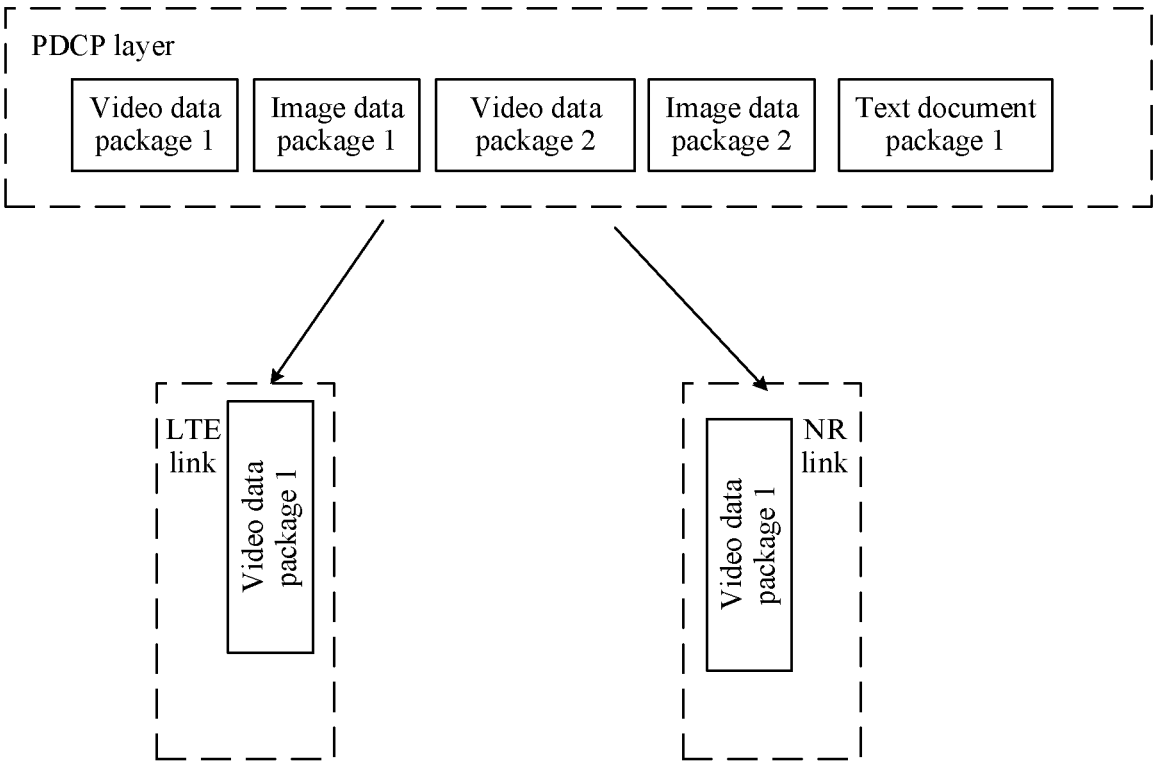
FIG. 11a is a first schematic diagram of data package transmission on different communication links according to an embodiment of this application.
Figure 11B:
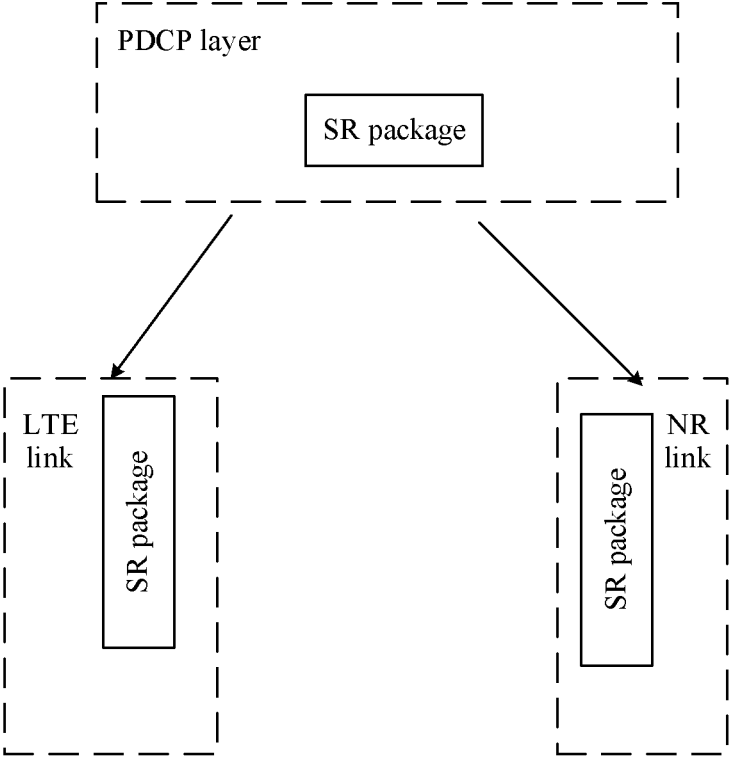
FIG. 11b is a second schematic diagram of data package transmission on different communication links according to an embodiment of this application.

As shown in FIG. 11a, five sub-data packages are buffered at a PDCP layer of a terminal device. It is assumed that the five sub-data packages are respectively a video data package 1, an image data package 1, a video data package 2, an image data package 2, and a text document package 1. A first data package may be the video data package 1. The terminal device duplicates the video data package 1 to obtain a second data package, where the first data package (the video data package 1) is transmitted on an LTE link, and the second data package (a video data package 1) is transmitted on an NR link. As shown in FIG. 11b, the terminal device sends a first data package (an SR package) on the LTE link, and sends a second data package (an SR package) on the NR link. The first data package (the SR package) is the same as the second data package (the SR package).

Step 1002a: A terminal device determines a transmission capability of an LTE link based on a transmission status of a first detection data package on the LTE link.

Step 1002b: The terminal device determines a transmission capability of an NR link based on a transmission status of a second detection data package on the NR link.

Step 1003a: After determining that a timer expires, the terminal device determines, based on the transmission capabilities of the LTE link and the NR link, a data amount of a data package sent on the LTE link.

Step 1003b: After determining that the timer expires, the terminal device determines, based on the transmission capabilities of the LTE link and the NR link, a data amount of a data package sent on the NR link.

It should be noted that, after a user initiates a service, data packages of different data amounts are allocated based on the capabilities of the two communication links, so that data transmission rates can be improved, and user experience can be further improved.

For example, after performing communication link transmission capability detection, the terminal device learns that the transmission capability of the LTE link is five times the transmission capability of the NR link. In this case, after the terminal device performs detection, if the user re-initiates service data of 24 Mbits, service data of 20 Mbits may be transmitted on the LTE link, and 4 Mbits are transmitted on the NR link. In other words, a third data package is of 20 Mbits, and a fourth data package is of 4 Mbits. However, in actual application, for example, the service data is of 24 Mbits, but there are 100 data packages buffered at the PDCP layer of the terminal device, including data packages of 150 kbits, 100 kbits, 200 kbits, 300 kbits and 60 kbits. After obtaining the transmission capabilities of the communication links, the terminal device may first transmit two data packages of 150 kbits (a total data amount is of 300 kbits) on the LTE link in the first ms, and transmit one data package of 60 kbits (a total data amount is of 60 kbits) on the NR link. In other words, data is transmitted at a ratio of 5 to 1 in the first ms. After obtaining the data, the network device feeds back a transmission status of the data package on each communication link in the first ms, and the terminal device may adjust a transmission policy in real time. If a transmission delay of the LTE link descends in the first ms compared with that before, during transmission at the second ms, a data package allocation policy is adjusted based on the transmission status of the first ms. Two 200-kbit data packages (a total data amount is of 400 kbits) may be transmitted on the LTE link, and one 100-kbit data package (a total data amount is of 100 kbits) is transmitted on the NR link. In other words, data is transmitted at a ratio of 4 to 1 in the second ms. After detecting the transmission capabilities of the communication links, in an actual data transmission process, the terminal dynamically adjusts a data amount of a data package on each communication link based on a transmission status of a data package on the communication link in a previous time period, to better adapt to a requirement of the terminal device, and improve a data transmission rate.

To enable the terminal device to obtain a good detection result in a communication link detection phase, the terminal device may send same data packages to network devices by enabling a data package duplication (Duplication) mechanism. After receiving the data package for the first time, any network device demodulates the data package to obtain data. When receiving a data package of same content for a second time, the network device directly discards the data package without demodulating the data package. After a first timer expires, the terminal device may disable the duplication mechanism, so that when the terminal device sends data packages of different content on different communication links, the data packages can be normally demodulated by the network devices. In the detection phase, detection is performed by sending data packages of same content, so that user experience for a service can be ensured. After the detection ends, uplink splitting of data is implemented by transmitting data packages of different content on different communication links. In this manner, user experience for a service can be improved.

The following describes uplink data splitting by using a specific example. It is assumed that before the timer expires, the terminal device enables the duplication mechanism, and sends, on the LTE link and the NR link, data packages including same information to the network devices, to obtain the transmission capability of the LTE link and the transmission capability of the NR link. The transmission capability is indicated herein by using a transmission delay. This is not specifically described herein in this embodiment. If the transmission delay of the LTE link is 100 ms, and the transmission delay of the NR link is 20 ms, it can be learned that the transmission capability of the NR link is approximately five times the transmission capability of the LTE link. Therefore, the terminal device may determine, based on the proportional relationship between the transmission capability of the LTE link and the transmission capability of the NR link, an allocation rule for a data amount of a data package. In other words, a ratio of a data amount transmitted on the NR link to a data amount transmitted on the LTE link is 5 to 1. Then, data transmission is performed on different communication links based on the data amount of the data package configured in the allocation rule, so that a user obtains good communication rate experience.

For example, there is service data of 12 Mbits in total. Because the transmission capability of the NR link is approximately five times the transmission capability of the LTE link, a 10-Mbit data package may be transmitted on the NR link, and a 2-Mbit data package may be transmitted on the LTE link. For ease of describing the solutions of this application, after the timer expires, a data amount is allocated according to the ratio based on the transmission capability of the NR link and the transmission capability of the LTE link, to describe uplink data splitting performed by the terminal device after the terminal device performs communication link transmission capability detection.

The following describes a detection occasion of the communication link transmission capability in this application with reference to a specific application scenario. One detection occasion is that the terminal device performs communication link transmission capability detection during initial network access. The initial network access may be understood as a moment when a mobile phone is restarted after the mobile phone is powered off or a moment when an airplane mode is disabled to exit the airplane mode. In another detection occasion, that is, when a user initiates a service by using the terminal device, the service is determined by the terminal device by determining a type of a data package, and the data package is transmitted through a 4G or 5G network. For example, in the 5G network, in response to an image transmission operation performed by the user, through tapping, on an instant messaging application installed by the user, the terminal device performs communication link transmission capability detection. In other words, when the terminal device needs to transmit service data through the 4G or 5G network in response to an operation performed by the user on the terminal device, the terminal device performs communication link transmission capability detection. In addition, another detection occasion is further included. In other words, when a specified time point is reached, detection needs to be performed. For example, if specified duration is 5 minutes, the terminal device performs detection every 5 minutes.

In addition, it should be noted that, after the terminal device has detected the transmission capability of the communication link after initially accessing a network, the terminal device does not need to perform detection again when initiating a service for the first time in response to a user operation. In addition, after one round of detection, if the terminal device simultaneously initiates a plurality of services in response to user operations within a preset time period, the terminal device does not need to perform detection again. After a round of detection ends, if the terminal device does not send any service within a preset time period, the terminal device needs to perform detection again. For example, when taking an airplane, a user sets a mobile phone to an airplane mode. After getting off the airplane, the user disables the airplane mode of the mobile phone. In response to an operation of disabling the airplane mode by the user, a terminal device needs to access a data network again. In this case, the terminal device detects a transmission capability of a communication link, and obtains a detection result 1 after the detection ends. When responding to an operation that is of uploading a picture of 5 Mbits to an instant messaging software application and that is performed by the user, the terminal device starts an uplink data splitting solution based on the detection result 1, to transmit data. After the picture is uploaded, the terminal device responds to an operation that is of uploading a short video to the instant messaging software application and that is performed by the user. In this case, the terminal device still starts the uplink splitting solution based on the detection result 1, to transmit data. After five hours of rest, the user sends a document package to a client by using the mobile phone. In this case, the terminal device detects a transmission capability of the communication link again in response to the user operation, and obtains a detection result 2.

In addition, to ensure that the user has good rate experience, the detection may alternatively be periodic detection, and a periodicity may be set to 5 minutes or 10 minutes. Specific duration is not specifically limited herein. For example, it is assumed that the detection periodicity is 5 minutes, and the user switches on the mobile phone at 8:00 in the morning. In this case, the transmission capability of the communication link needs to be detected. At 8:05, a transmission capability of the communication link is detected again. Then the detection is performed again at 8:10, 8:15, 8:20, 8:25, and the like. These are not listed one by one herein.

In addition, it should be further noted that the foregoing three detection occasions may be combined, to flexibly determine a communication link detection occasion of the terminal device. For example, after the mobile phone is powered on and accesses a network, the transmission capability of the communication link is detected, and a detection periodicity is set to 5 minutes. However, when a time point of the detection periodicity is reached, if the mobile phone just performs a round of communication link transmission capability detection, the detection does not need to be performed at the time point corresponding to the detection periodicity.

The following provides descriptions by using an example in which a moment at which the terminal device initially accesses a network is used as a detection occasion.

After initially accessing the network, the terminal device may first obtain, according to 3GPP protocol 38.331, uplink splitting parameters configured by a base station, where the parameters include primary path, ul-datasplit threshold, and pdcp-duplication. The base station can perform configuration in the following manner:

```
moreThanoneRLC    SEQUENCE{
primaryPath    SEQUENCE{
cellGroup
logicalChannel
    },
ul-datasplitthreshold              UL-DataSplitThreshold
pdcp-duplication                   BOOLEAN
}
```

In this manner, primary path indicates a primary transmission path for uplink data splitting; cellGroup indicates a cell parameter of the primary transmission path; logicalChannel indicates a logical channel supported by the primary transmission path; ul-datasplitthreshold indicates an ul-datasplit threshold of an uplink data package; and pdcp-duplication indicates whether duplication is supported.

In addition, when the terminal device initially accesses a network and no service is generated, a duplication mechanism may be enabled, and data packages of same content are respectively sent on the NR link and the LTE link to detect the transmission capabilities of the communication links. In other words, a data package of a first service to be executed after the initial network access is sent to the base station, to detect transmission delays or transmission rates of the two communication links; or SR request packages are sent to the base station when no service occurs, to detect transmission delays or transmission rates of the two communication links. After obtaining the transmission capabilities of the two communication links, the terminal stores detection results.

For different ul-datasplit thresholds, uplink splitting may be performed in different manners. During specific execution, there may be the following cases.

In case 1, ul-datasplitthreshold of the uplink data package is configured with a specific value.

It should be noted that the terminal device may determine, based on an amount of service data buffered at the PDCP layer and ul-datasplitthreshold, whether to start uplink splitting. If the data amount at the PDCP layer does not exceed an ul-datasplit threshold, splitting is not performed. In other words, uplink data is transmitted by using the primary path. If the data amount at the PDCP layer exceeds an ul-datasplit threshold, splitting is started, and service data is simultaneously transmitted, based on the detection result, in an MCG corresponding to the LTE link and an SCG corresponding to the NR link according to a ratio. For example, the ul-datasplit threshold of the uplink data package is 20 Mbits, the primary path is the MCG, and the detection result is that the transmission capability of the LTE link is four times the transmission capability of the NR link. When the amount of the data buffered at the PDCP layer is 15 Mbits, the data amount does not exceed the ul-datasplit threshold, and data may be directly transmitted by using the MCG. When the amount of the data buffered at the PDCP layer is 25 Mbits, the data amount exceeds the ul-datasplit threshold, and data may be allocated at a ratio of 4 to 1. In other words, the MCG transmits data of 20 Mbits, and the SCG transmits data of 5 Mbits, so that data is jointly transmitted. Specifically, execution may be performed with reference to a schematic flowchart of uplink data splitting shown in FIG. 12.

Step 1201: A terminal device initially accesses a network and obtains uplink splitting parameters. The uplink splitting parameters are sent by a network device.

Step 1202: The terminal device enables a duplication mechanism.

Step 1203*a*: The terminal device sends a first detection data package to a first network device.

Step 1203*b*: The terminal device sends a second detection data package to a second network device.

Step 1204*a*: The terminal device receives first response information that is of the first detection data package and that is fed back by the first network device, and determines a transmission capability of an LTE link based on the first response information.

Step 1204*b*: The terminal device receives second response information that is of the second detection data package and that is fed back by the second network device, and determines a transmission capability of an NR link based on the second response information.

Step 1205: The terminal device disables the duplication mechanism.

Step 1206: The terminal device determines whether an amount of data buffered at a PDCP layer exceeds an ul-datasplit threshold; and if the amount of data buffered at the PDCP layer exceeds the ul-datasplit threshold, step 1207 is performed; or if the amount of data buffered at the PDCP layer does not exceed the ul-datasplit threshold, step 1208 is performed.

Step 1207: The terminal device splits to-be-transmitted data based on the transmission capabilities of the communication links.

Step 1208: The terminal device does not send data in an uplink splitting manner.

In case 2, ul-datasplitthreshold of the uplink data package is configured as infinity.

It should be noted that, because the ul-datasplit threshold is infinity, the terminal device may autonomously start uplink splitting based on an amount of service data buffered at the PDCP layer and a service type, where the service type is determined by using indication information included in the data package, and the indication information is used to indicate whether the data package is a data package generated for some specific services. The terminal device may determine an occasion for performing uplink splitting based on the amount of service data buffered at the PDCP layer and the service type displayed in the indication information.

For example, a primary path primarypath is an MCG, and a detection result is that the transmission capability of the LTE link is four times the transmission capability of the NR link. When the amount of data buffered at the PDCP layer is 15 Mbits, and the service type is that an instant messaging tool transmits chat data in a place (for example, a data center of an operator or a place near a signal transmission tower) having good signal coverage, data splitting is not performed, and service data may be directly transmitted by using the MCG. When the amount of data buffered at the PDCP layer is 15 Mbits, and the service type is that an instant messaging tool transmits chat data in a place (for example, a railway station, an airport, or a mountainous area) having poor signal coverage, service data needs to be split and transmitted by using the MCG and an SCG. When the amount of data buffered at the PDCP layer is 15 Mbits, and the service type is a complex service (for example, a game, artificial intelligence (artificial intelligence, AI), or virtual reality (virtual reality, VR) technology rendering), service data needs to be split and transmitted by using the MCG and the SCG. When the amount of data buffered at the PDCP layer is 25 Mbits, regardless of the service type, service data needs to be split and transmitted by using the MCG and the SCG. Specifically, execution may be performed with reference to a schematic flowchart of uplink splitting shown in FIG. 13.

Step 1301: A terminal device initially accesses a network and obtains uplink splitting parameters. The uplink splitting parameters are sent by a network device.

Step 1302: The terminal device enables a duplication mechanism.

Step 1303*a*: The terminal device sends a first detection data package to a first network device.

Step 1303*b*: The terminal device sends a second detection data package to a second network device.

Step 1304*a*: The terminal device receives first response information that is of the first detection data package and that is fed back by the first network device, and determines a transmission capability of an LTE link based on the first response information.

Step 1304*b*: The terminal device receives second response information that is of the second detection data package and that is fed back by the second network device, and determines a transmission capability of an NR link based on the second response information.

Step 1305: The terminal device disables the duplication mechanism.

Step 1306: The terminal device determines whether an amount of data buffered at a PDCP layer and/or a service type of a data package meets a splitting requirement; and if the amount of data buffered at the PDCP layer and/or the service type of the data package meets the splitting requirement, step 1307 is performed; or if the amount of data buffered at the PDCP layer and/or the service type of the data package does not meet the splitting requirement, step 1308 is performed.

Step 1307: The terminal device splits to-be-transmitted data based on the transmission capabilities of the communication links.

Step 1308: The terminal device does not send data in an uplink splitting manner.

Figure 13:
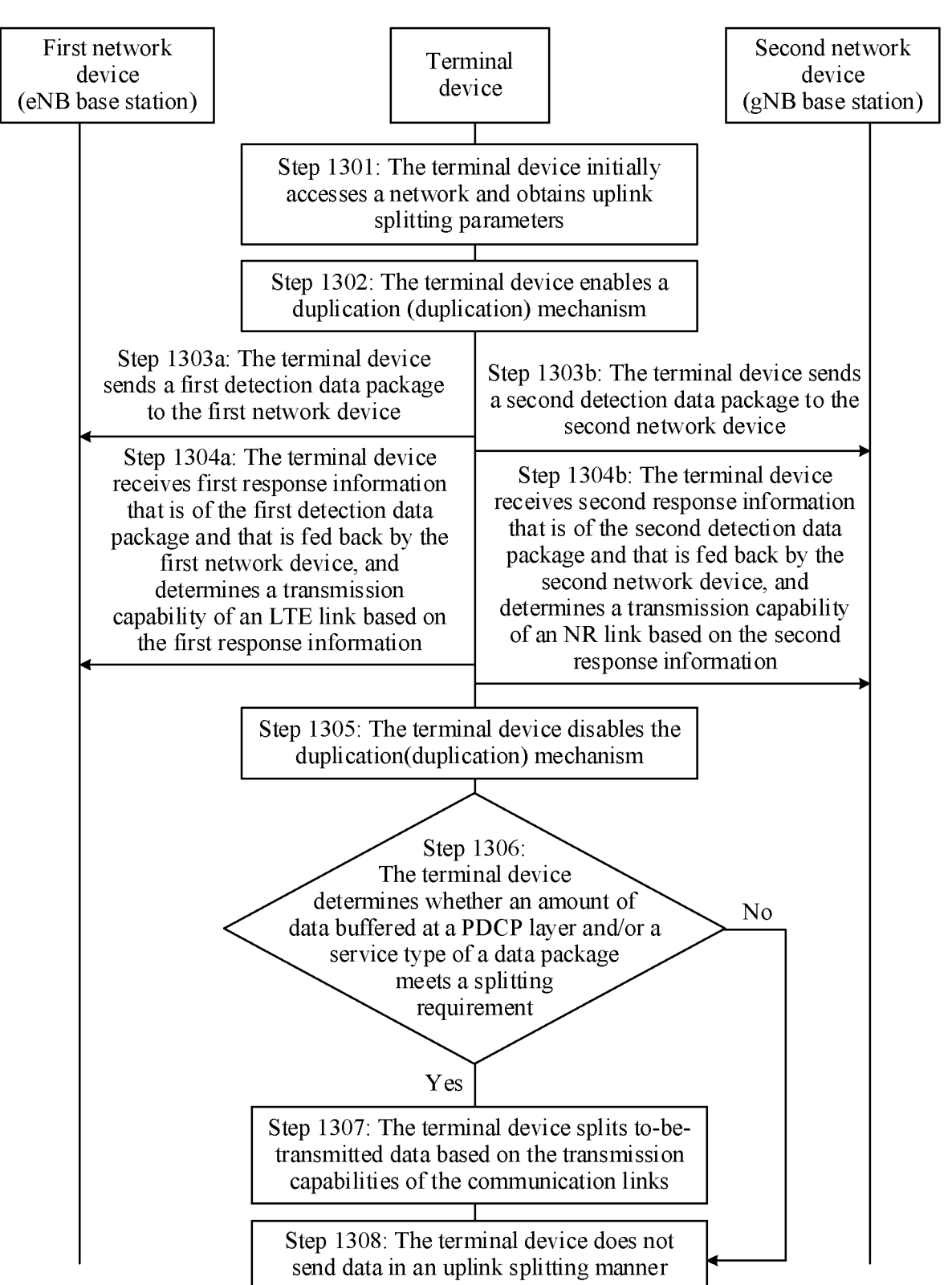
FIG. 13 is a second schematic diagram of a process of uplink data splitting according to an embodiment of this application.
Figures 14, 15:
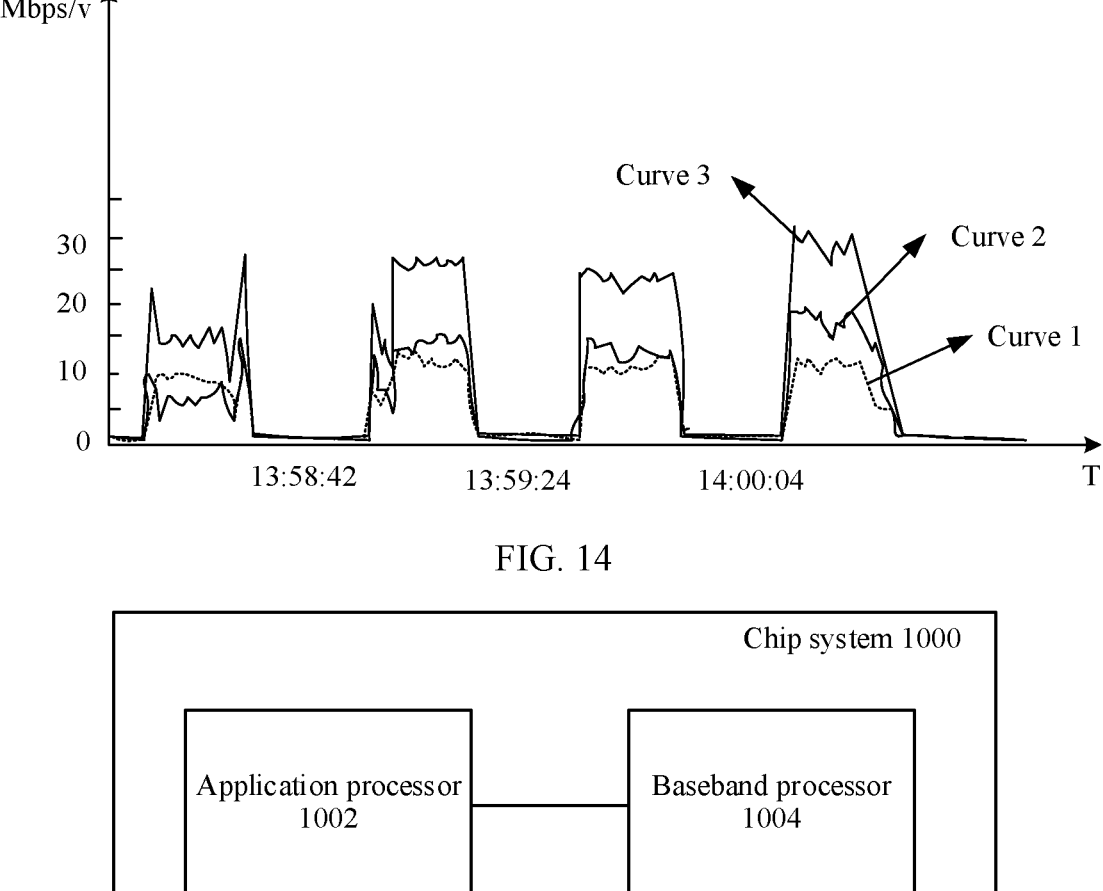
FIG. 14 is a schematic diagram of a detection result of uplink data splitting according to an embodiment of this application.
FIG. 15 is a schematic diagram of a chip system according to an embodiment of this application.

Therefore, it can be learned that in the uplink splitting manner provided in FIG. 13, the terminal device may autonomously determine a splitting occasion, so that a data communication transmission rate is increased and user experience is improved. In addition, when the solutions of this application are used to perform actual tests such as a Speedtest test and uploading an image in an instant messaging application, an obtained test result is shown in FIG. 14. A curve 1 indicates a transmission rate of service data on an NR link when an uplink splitting solution is not used. A curve 2 indicates a transmission rate of service data on an LTE link when the uplink splitting solution is not used. A curve 3 indicates a transmission rate of service data when the uplink splitting solution is used. It can be clearly learned from the schematic diagram shown in FIG. 14 that a data transmission rate is significantly improved after the uplink splitting solution in this application is used.

An embodiment of this application further provides a chip system. A chip system 1000 shown in FIG. 15 includes an application processor (application processor, AP) 1002 and a baseband processor (baseband processor, BP) 1004. A full name of an application processor is a multimedia application processor (multimedia application processor, MAP). A multimedia application processor refers to a very large scale integrated circuit that extends audio and video functions and a dedicated interface based on a low-power consumption central processing unit CPU. Application processors are mainly classified into three types, and may include a comprehensive processor, a multimedia processor, and a single media processor. The comprehensive processor has a function of a multimedia application processor, and also can run a complex operating system such as Linux. The multimedia processor is a processor that processes more than two types of media, for example, media such as an image, sound, a video, and 3D graphics. The single media processor is a processor that processes one type of medium, and is usually used only to process an image or sound.

The baseband processor is an important component in a system chip, and is equivalent to a protocol processor. The baseband processor is responsible for data processing and storage, and mainly includes units such as a digital signal processor (digital signal processor, DSP), a micro controller unit (micro controller unit, MCU), and a memory (such as a flash memory). A corresponding main function of the baseband processor is baseband encoding or decoding, sound encoding, voice encoding, and the like. Currently, the baseband processor supports a plurality of communication standards (for example, GSM, LTE, and CDMA), and further provides a multimedia function and a communication interface related to a multimedia display, an image sensor, and an audio device.

In actual application, software that can be run by the application processor AP generally includes an operating system, a user interface, an application, and the like. The baseband processor BP may be considered as a radio modem module, and is responsible for coordinating and controlling communication between the BP and a base station and between the BP and the AP. Software that can be run by the baseband processor includes communication control software of the baseband modem, and the like.

Mutual communication between the application processor AP and the baseband processor BP can be implemented by using a preset interface technology. The interface technology may be customized by a system. For example, the interface technology includes but is not limited to an interface technology such as a serial peripheral interface (serial peripheral interface, SPI), a universal asynchronous receiver/transmitter (universal asynchronous receiver/transmitter, UART), a universal serial bus (universal serial bus, USB), or a general-purpose input/output (general-purpose input/output, GPIO) control line. Specifically, mutual communication and transmission between the application processor and the baseband processor may be implemented in a message format by using a control command, to complete functions such as a call, an SMS message, and mobile internet access. The control command may include a conventional AT (attention) command, a mobile broadband interface model (mobile broadband interface model, MBIM) command, another protocol command that supports mutual transmission between the AP and the BP, or the like.

Optionally, the baseband processor BP shown in FIG. 15 can run protocol software related to a non-access stratum NAS and a radio resource control RRC layer. In actual application, the application processor AP can communicate with the NAS and the RRC layer in the baseband processor BP. For example, in this application, the application processor AP may send a corresponding signaling message to the NAS by using a conventional AT command, to notify the NAS of information such as an application status or a device screen status that is currently learned by the AP.

In actual application, the chip system generally refers to a highly complex system chip, for example, a SoC chip. During actual deployment, the chip may be deployed inside a device, or may be deployed outside a device, and the device is controlled through a wired connection or a wireless connection. The device includes but is not limited to user equipment UE or a terminal device. For example, the device may specifically include a smartphone, a mobile internet device (mobile internet devices, MID), a wearable intelligent device, or another device that supports network communication. Specifically, when the chip system 100 is deployed inside the user equipment, the chip system 1000 is directly configured to implement the method described in any one of the foregoing method embodiments. When the system chip 1000 is deployed outside the user equipment, and communication between the chip system 1000 and the user equipment can be established in a wired or wireless connection manner, the user equipment invokes or controls the chip system 1000 to implement the method described in any one of the foregoing method embodiments.

For example, the application processor is configured to: in response to a user operation, run an application to generate a first data package, and send the first data package to the baseband processor. The baseband processor receives the first data package, and determines whether the first data package is sent on an NR link or on an LTE link. If the first data package is sent on the NR link, the baseband processor determines whether the first data package is a preset data package. If the first data package is a preset data package, the baseband processor increases transmit power of the NR link, and sends the first data package on the NR link at increased transmit power. It is assumed that the application processor generates a second data package and sends the second data package to the baseband processor. The baseband processor determines that the second data package is sent on the LTE link, and determines that transmit power of the LTE link is third transmit power, where a sum of the third transmit power and the increased transmit power of the NR link is less than or equal to total transmit power of the terminal. Accordingly, the baseband processor sends the second data package on the LTE link at the third transmit power.

Figure 16:
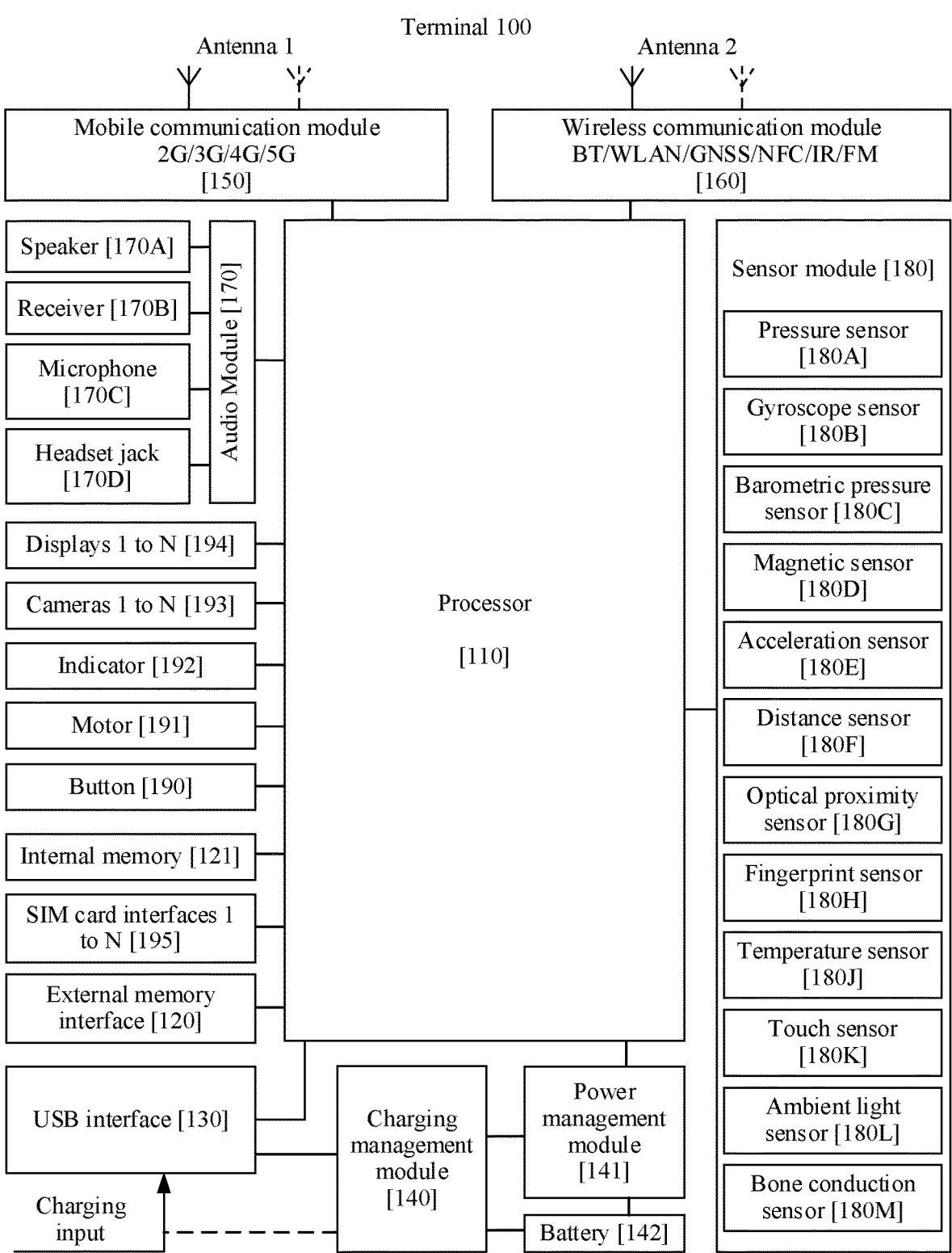
FIG. 16 is a schematic diagram of a structure of a terminal device according to an embodiment of this application.

FIG. 16 shows a schematic diagram of a structure of a terminal according to an embodiment of this application.

The following uses a terminal 100 as an example to describe this embodiment in detail. It should be understood that the terminal 100 shown in FIG. 16 is merely an example. The terminal 100 may have more or fewer components than those shown in FIG. 16, may combine two or more components, or may have different component configurations. The various components shown in the figure may be implemented in hardware including one or more signal processing and/or application-specific integrated circuits, software, or a combination of hardware and software.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the terminal 100. In other embodiments of this application, the terminal 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the terminal 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K through an I2C interface, so that the processor 110 communicates with the touch sensor 180K by using the I2C bus interface, to implement a touch function of the terminal 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, to sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be further configured as an I2C interface, an I2S interface, a UART interface, an MIPI interface, or the like.

The USB interface 130 is an interface that conforms to a USB standard specification, and may be specifically a Mini USB interface, a Micro USB interface, a USB Type-C interface, or the like. The USB interface 130 may be configured to connect to a charger to charge the terminal 100, or may be configured to transmit data between the terminal 100 and a peripheral device, or may be configured to connect to a headset, to play audio through the headset. The interface may be further configured to connect to another terminal such as an AR device.

It may be understood that an interface connection relationship between modules illustrated in this embodiment of the present invention is merely an example for description, and does not constitute a limitation on a structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some wired charging embodiments, the charging management module 140 may receive a charging input from a wired charger through the USB interface 130. In some wireless charging embodiments, the charging management module 140 may receive a wireless charging input through a wireless charging coil of the terminal 100. When charging the battery 142, the charging management module 140 may further supply power to the terminal by using the power management module 141.

The power management module 141 is configured to connect to the battery 42, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication that includes 2G/3G/4G/5G or the like and that is applied to the terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the terminal 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 and the mobile communication module 150 are coupled, and the antenna 2 and the wireless communication module 160 are coupled, so that the terminal 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Bei-Dou navigation satellite system (BeiDou navigation satellite system, BDS), a quasi-zenith satellite system (quasi-zenith satellite system, QZSS), and/or a satellite based augmentation system (satellite based augmentation systems, SBAS).

The terminal 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and a light ray is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion that are of the image. The ISP may further optimize parameters such as exposure and color temperature that are of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semi-conductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the terminal 100 may include one or N cameras 193, where N is a positive integer greater than 1.

The digital signal processor is configured to process a digital signal, and may process another digital signal in addition to a digital image signal. For example, when the terminal 100 selects a frequency, the digital signal processor is configured to perform Fourier transform on frequency energy, and the like.

The video codec is configured to compress or decompress a digital video. The terminal 100 may support one or more video codecs. In this way, the terminal 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the terminal 100, such as image recognition, facial recognition, voice recognition, and text understanding, may be implemented by using the NPU.

The external memory interface 120 may be configured to connect to an external storage card, for example, a micro SD card, to extend a storage capability of the terminal 100. The external storage card communicates with the processor 110 through the external memory interface 120, to implement a data storage function. For example, files such as music and a video are stored in the external storage card.

The internal memory 121 may be configured to store computer executable program code, where the executable program code includes instructions. The processor 110 runs the instructions stored in the internal memory 121, to perform various function applications and data processing of the terminal 100. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the terminal 100. In addition, the internal memory 121 may include a high-speed random access memory, or may include a non-volatile memory, such as at least one magnetic disk storage device, a flash memory, or a universal flash storage (universal flash storage, UFS).

The terminal 100 may implement an audio function by using the audio module 170, the speaker 170A, the receiver 170B, the microphone 170C, the headset port 170D, the application processor, and the like. For example, a music playback function and a recording function are implemented.

The audio module 170 is configured to convert digital audio information into an analog audio signal output, and is also configured to convert an analog audio input into a digital audio signal. The audio module 170 may be further configured to: encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal 100 may listen to music or answer a hands-free call by using the speaker 170A.

The receiver 170B, also referred to as an "earpiece", is configured to convert an audio electrical signal into a sound signal. When a call is answered or voice information is listened to by using the terminal 100, the receiver 170B may be put close to a human ear to listen to a voice.

The microphone 170C, also referred to as a "mike" or a "microphone", is configured to convert a sound signal into an electrical signal. When making a call or sending voice information, a user may place the mouth of the user near the microphone 170C to make a sound, to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates that are made of conductive materials. When a force is applied to the pressure sensor 180A, capacitance between electrodes changes. The terminal 100 determines pressure intensity based on a capacitance change. When a touch operation is performed on the display 194, the terminal 100 detects the touch operation intensity by using the pressure sensor 180A. The terminal 100 may also calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 180B may be configured to determine a motion posture of the terminal 100. In some embodiments, an angular velocity of the terminal 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may be further used in navigation and a motion sensing game scenario.

The barometric pressure sensor 180C is configured to measure barometric pressure. In some embodiments, the terminal 100 calculates an altitude by using a barometric pressure value measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a flip phone, the terminal 100 may detect opening and closing of a flip cover based on the magnetic sensor 180D. Further, a feature such as automatic unlocking of the flip cover are set based on a detected opening or closing state of the leather case or a detected opening or closing state of the flip cover.

The acceleration sensor 180E may detect magnitudes of accelerations in various directions (generally on three axes) of the terminal 100. When the terminal 100 is stationary, a magnitude and a direction of gravity may be detected. The electronic device 1300 may be further configured to identify a posture of the terminal, and is used in screen switching between a landscape mode and a portrait mode, a pedometer, or another application.

The distance sensor 180F is configured to measure a distance. The terminal 100 may measure a distance in an infrared manner or a laser manner. In some embodiments, in a photographing scenario, the terminal 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, the terminal 100 may determine that there is an object near the terminal 100. When insufficient reflected light is detected, the terminal 100 may determine that there is no object near the terminal 100. The terminal 100 may detect, by using the optical proximity sensor 180G, that a user holds the terminal 100 close to an ear to make a call, to automatically turn off a screen for power saving. The optical proximity sensor 180G can also be used in a leather case mode or a pocket mode to automatically unlock or lock the screen.

The ambient light sensor 180L is configured to sense ambient light brightness. The terminal 100 may adaptively adjust brightness of the display 194 based on sensed ambient light brightness. The ambient optical sensor 180L may also be configured to automatically adjust white balance during photographing. The ambient optical sensor 180L may further cooperate with the optical proximity sensor 180G to detect whether the terminal 100 is in a pocket, to prevent an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy based on the temperature detected by the temperature sensor 180J. For example, when a temperature reported by the temperature sensor 180J exceeds a threshold, the terminal 100 lowers performance of a processor located near the temperature sensor 180J, to reduce power consumption and implement thermal protection. In some other embodiments, when the temperature is lower than another threshold, the terminal 100 heats the battery 142, to avoid abnormal shutdown of the terminal 100 caused by a low temperature. In some other embodiments, when the temperature is lower than still another threshold, the terminal 100 boosts an output voltage of the battery 42, to avoid abnormal shutdown caused by a low temperature.

The touch sensor 180K is also referred to as a "touch panel". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor, to determine a type of a touch event. A visual output related to the touch operation may be provided by using the display 194. In some other embodiments, the touch sensor 180K may be alternatively disposed on a surface of the terminal 100, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to user setting and function control of the terminal 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with and separation from the terminal 100. The terminal 100 may support one or N SIM card interfaces, where N is a positive integer greater than 1. The SIM card interface 195 can support a nano-SIM card, a micro-SIM card, a SIM card, and the like. A plurality of cards may be inserted into a same SIM card interface 195 at the same time. The plurality of cards may be of a same type or of different types. The SIM card interface 195 may also be compatible with different types of SIM cards. The SIM card interface 195 may also be compatible with an external memory card. The terminal 100 interacts with a network through a SIM card, to implement functions such as calling and data communication. In some embodiments, the terminal 100 uses an eSIM, that is, an embedded SIM card. The eSIM card may be embedded in the terminal 100, and cannot be separated from the terminal 100.

The terminal 100 may further include a magnetometer (not shown in the figure). The magnetometer may also be referred to as an electronic compass or a compass, and may be configured to detect intensity and a direction of a magnetic field.

Based on the descriptions in the foregoing implementations, a person skilled in the art may clearly understand that this application may be implemented by hardware, firmware, or a combination thereof. When the functions are implemented by using software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can be used to carry or store expected program code in a form of instructions or a data structure and can be accessed by a computer. In addition, any connection may be properly defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, the optical fiber/cable, the twisted pair, the DSL, or the wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination should also be included in the protection scope of the computer-readable medium.

In conclusion, the foregoing descriptions are merely embodiments of the technical solutions of this application, but are not intended to limit the protection scope of this application. Any modification, equivalent replacement, or improvement made according to the disclosure of this application shall fall within the protection scope of this application.

What is claimed is:

1. A method, comprising:
   determining, by a terminal device, a value of an ul-datasplit threshold in uplink data splitting parameters and an amount of data of the terminal device buffered at a packet data convergence protocol (PDCP) layer; and
   after the determining the value of the ul-datasplit threshold and after determining that a timer expires, determining, by the terminal device based on a first transmission capability of a long term evolution (LTE) link and a second transmission capability of a new radio (NR) link, a data amount of a data package transmitted on the LTE link and the NR link, wherein the determining the data amount of the data package transmitted on the LTE link and the NR link comprises:

allocating, by the terminal device, the data amount of the data package based on the value of the ul-datasplit threshold, the amount of the data of the terminal device buffered, the first transmission capability of the LTE link, and the second transmission capability of the NR link, wherein the first transmission capability of the LTE link is determined by transmitting, by the terminal device, a first detection data package on the LTE link before the timer expires, wherein the second transmission capability of the NR link is determined by transmitting, by the terminal device, a second detection data package on the NR link before the timer expires, and wherein the second detection data package is a duplication of the first detection data package.

2. The method according to claim 1, wherein the method further comprises:

receiving, by the terminal device, first response information of the first detection data package;

determining, by the terminal device, the first transmission capability of the LTE link based on the first response information, wherein the first response information comprises a first moment at which a first Radio Link Control (RLC) layer of a first network device receives the first detection data package;

receiving, by the terminal device, second response information of the second detection data package; and determining, by the terminal device, the second transmission capability of the NR link based on the second response information, wherein the second response information comprises a second moment at which a second RLC layer of a second network device receives the second detection data package.

3. The method according to claim 1, wherein the first transmission capability of the LTE link is indicated by one of:

a first transmission delay of the first detection data package on the LTE link, or a first transmission rate of the first detection data package on the LTE link, and wherein the second transmission capability of the NR link is indicated by one of:

a second transmission delay of the second detection data package on the NR link, or a second transmission rate of the second detection data package on the NR link, and wherein the first transmission capability of the LTE link and the second transmission capability of the NR link are indicated by indication information of a same measurement indicator.

4. The method according to claim 1, wherein the first detection data package is one of:

a service data package generated in response to an operation performed by a user on an application of the terminal device, or a service request (SR) package.

5. The method according to claim 1, wherein the determining the data amount of the data package transmitted on the LTE link and the NR link comprises:

determining, by the terminal device, an allocation rule for the data amount of the data package based on a proportional relationship between the first transmission capability of the LTE link and the second transmission capability of the NR link; and transmitting, by the terminal device according to the allocation rule, the data package of a first corresponding data amount on the LTE link and a second corresponding data amount of the NR link.

6. The method according to claim 1, wherein the method further comprises:

enabling, by the terminal device, a data package duplication mechanism before the determining that the timer expires; and disabling, by the terminal device, the data package duplication mechanism after the determining that the timer expires.

7. A terminal device, comprising:

at least one processor; and a computer storage medium, wherein the computer storage medium stores instructions that, when executed by the at least one processor, cause the terminal device to perform operations including:

determining a value of an ul-datasplit threshold in uplink data splitting parameters and an amount of data of the terminal device buffered at a packet data convergence protocol (PDCP) layer; and after the determining the value of the ul-datasplit threshold and after determining that a timer expires, determining, based on a first transmission capability of a long term evolution (LTE) link and a second transmission capability of a new radio (NR) link, a data amount of a data package transmitted on the LTE link and the NR link, wherein the determining the data amount of the data package transmitted on the LTE link and the NR link comprises:

allocating the data amount of the data package based on the value of the ul-datasplit threshold, the amount of the data of the terminal device buffered, the first transmission capability of the LTE link, and the second transmission capability of the NR link, wherein the first transmission capability of the LTE link is determined by transmitting, by the terminal device, a first detection data package on the LTE link before the timer expires, wherein the second transmission capability of the NR link is determined by transmitting, by the terminal device, a second detection data package on the NR link before the timer expires, and wherein the second detection data package is a duplication of the first detection data package.

8. The terminal device according to claim 7, the operations further comprising:

receiving first response information of the first detection data package;

determining the first transmission capability of the LTE link based on the first response information, wherein the first response information comprises a first moment at which a first Radio Link Control (RLC) layer of a first network device receives the first detection data package;

receiving second response information of the second detection data package; and determining the second transmission capability of the NR link based on the second response information, wherein the second response information comprises a second moment at which a second RLC layer of a second network device receives the second detection data package.

9. The terminal device according to claim 7, wherein the first transmission capability of the LTE link is indicated by one of:
a first transmission delay of the first detection data package on the LTE link, or
a first transmission rate of the first detection data package on the LTE link, and
wherein the second transmission capability of the NR link is indicated by one of:
a second transmission delay of the second detection data package on the NR link, or
a second transmission rate of the second detection data package on the NR link, and
wherein the first transmission capability of the LTE link and the second transmission capability of the NR link are indicated by indication information of a same measurement indicator.

10. The terminal device according to claim 7, wherein the first detection data package is one of:
a service data package generated in response to an operation performed by a user on an application of the terminal device, or
a service request (SR) package.

11. The terminal device according to claim 7, wherein the determining the data amount of the data package transmitted on the LTE link and the NR link comprises:
determining an allocation rule for the data amount of the data package based on a proportional relationship between the first transmission capability of the LTE link and the second transmission capability of the NR link; and
transmitting, according to the allocation rule, the data package of a first corresponding data amount on the LTE link and a second corresponding data amount of the NR link.

12. The terminal device according to claim 7, the operations further comprising:
enabling a data package duplication mechanism before the determining that the timer expires; and
disabling the data package duplication mechanism after the determining that the timer expires.

13. A chip system, wherein the chip system comprises:
an application processor; and
a baseband processor, wherein
the application processor is configured to:
generate a data package in response to a user operation; and
the baseband processor is configured to:
determine a value of an ul-datasplit threshold in uplink data splitting parameters and an amount of data of a terminal device buffered at a packet data convergence protocol (PDCP) layer; and
after determining the value of the ul-datasplit threshold and after determining that a timer expires, determine, based on a first transmission capability of a long term evolution (LTE) link and a second transmission capability of a new radio (NR) link, a data amount of the data package transmitted on the LTE link and the NR link,
wherein determining the data amount of the data package transmitted on the LTE link and the NR link comprises:
allocating the data amount of the data package based on the value of the ul-datasplit threshold, the amount of the data of the terminal device buffered, the first transmission capability of the LTE link, and the second transmission capability of the NR link,
wherein the first transmission capability of the LTE link is determined by transmitting a first detection data package on the LTE link before the timer expires,
wherein the second transmission capability of the NR link is determined by transmitting a second detection data package on the NR link before the timer expires, and
wherein the second detection data package is a duplication of the first detection data package.

14. The chip system according to claim 13, wherein the baseband processor is further configured to:
receive first response information of the first detection data package; and
determine the first transmission capability of the LTE link based on the first response information, wherein the first response information comprises a first moment at which a Radio Link Control (RLC) layer of a first network device receives the first detection data package;
receive second response information of the second detection data package; and
determine the second transmission capability of the NR link based on the second response information, wherein the second response information comprises a second moment at which a second RLC layer of a second network device receives the second detection data package.

15. The chip system according to claim 13,
wherein the first transmission capability of the LTE link is indicated by one of:
a first transmission delay of the first detection data package on the LTE link, or
a first transmission rate of the first detection data package on the LTE link, and
wherein the second transmission capability of the NR link is indicated by one of:
a second transmission delay of the second detection data package on the NR link, or
a second transmission rate of the second detection data package on the NR link, and
wherein the first transmission capability of the LTE link and the second transmission capability of the NR link are indicated by indication information of a same measurement indicator.

16. The chip system according to claim 13, wherein the chip system is applied to the terminal device, and wherein the first detection data package is one of:
a service data package generated in response to an operation performed by a user on an application of the terminal device, or
a service request (SR) package.

17. The chip system according to claim 13, wherein the baseband processor is configured to:
determine an allocation rule for the data amount of the data package based on a proportional relationship between the first transmission capability of the LTE link and the second transmission capability of the NR link; and
transmit, according to the allocation rule, the data package of a first corresponding data amount on the LTE link and a second corresponding data amount of the NR link.

18. The chip system according to claim 13, wherein the baseband processor is further configured to:
enable a data package duplication mechanism before determining that the timer expires; and disable the data package duplication mechanism after determining that the timer expires.

* * * * *